US011785454B2

(12) United States Patent
Kuge et al.

(10) Patent No.: US 11,785,454 B2
(45) Date of Patent: Oct. 10, 2023

(54) TERMINAL APPARATUS, BASE STATION APPARATUS, MOBILITY MANAGEMENT ENTITY (MME), AND COMMUNICATION CONTROL METHOD

(71) Applicants: SHARP KABUSHIKI KAISHA, Sakai (JP); FG INNOVATION COMPANY LIMITED, Hong Kong (CN)

(72) Inventors: Yoko Kuge, Sakai (JP); Masafumi Aramoto, Sakai (JP)

(73) Assignees: SHARP KABUSHIKI KAISHA, Sakai (JP); FG INNOVATION COMPANY LIMITED, Hong Kong (CN)

( * ) Notice: Subject to any disclaimer, the term of this patent is extended or adjusted under 35 U.S.C. 154(b) by 0 days.

(21) Appl. No.: 16/091,470

(22) PCT Filed: Apr. 3, 2017

(86) PCT No.: PCT/JP2017/013931
§ 371 (c)(1),
(2) Date: Oct. 4, 2018

(87) PCT Pub. No.: WO2017/175714
PCT Pub. Date: Oct. 12, 2017

(65) Prior Publication Data
US 2019/0159027 A1 May 23, 2019

(30) Foreign Application Priority Data
Apr. 5, 2016 (JP) .................. 2016-075623

(51) Int. Cl.
*H04W 48/18* (2009.01)
*H04W 12/06* (2021.01)
(Continued)

(52) U.S. Cl.
CPC ............. *H04W 12/06* (2013.01); *H04W 8/08* (2013.01); *H04W 36/0022* (2013.01);
(Continued)

(58) Field of Classification Search
None
See application file for complete search history.

(56) References Cited

U.S. PATENT DOCUMENTS

| 2012/0189016 A1* | 7/2012 | Bakker | ................. H04W 76/11 370/401 |
| 2014/0211728 A1* | 7/2014 | Zembutsu | ............. H04W 24/02 370/329 |

(Continued)

FOREIGN PATENT DOCUMENTS

| WO | WO-2017063708 A1 * | 4/2017 | ............ H04W 12/06 |
| WO | WO 2017/080518 A1 | 5/2017 | |
| WO | WO 2017/135860 A1 | 8/2017 | |

OTHER PUBLICATIONS

"3rd Generation Partnership Project; Technical Specification Group Services and System Aspects; Feasibility Study on New Services and Markets Technology Enablers; Stage 1 (Release 14)", 3GPP TR 22.891 V14.0.0, (Mar. 2016), pp. 1-95.

(Continued)

*Primary Examiner* — Ajit Patel
*Assistant Examiner* — Pamit Kaur
(74) *Attorney, Agent, or Firm* — FINNEGAN, HENDERSON, FARABOW, GARRETT & DUNNER, LLP

(57) ABSTRACT

Provided is a communication procedure for data transmission and/or reception suitable for a Network Slice and a DeCOR. One or a plurality of Network Slices are included in a core network managed by the network operator, the Network Slice is configured of one or a plurality of Network Functions, and based on registration information of a terminal apparatus or a request of the terminal apparatus, the terminal apparatus performs processing to connect to the one or the plurality of Network Slices corresponding to a service or an application. Furthermore, based on an authentication result from the network, the terminal apparatus performs processing to connect to a supplemental Network Slice.

18 Claims, 14 Drawing Sheets

(51) Int. Cl.
    H04W 60/00     (2009.01)
    H04W 92/18     (2009.01)
    H04W 76/11     (2018.01)
    H04W 76/27     (2018.01)
    H04W 8/08      (2009.01)
    H04W 36/00     (2009.01)
    H04W 48/00     (2009.01)
    H04W 60/06     (2009.01)
    H04W 84/04     (2009.01)
    H04W 84/12     (2009.01)

(52) U.S. Cl.
    CPC ........... *H04W 48/17* (2013.01); *H04W 48/18* (2013.01); *H04W 60/00* (2013.01); *H04W 60/06* (2013.01); *H04W 76/11* (2018.02); *H04W 76/27* (2018.02); *H04W 92/18* (2013.01); *H04W 84/042* (2013.01); *H04W 84/12* (2013.01)

(56) References Cited

U.S. PATENT DOCUMENTS

| | | | | |
|---|---|---|---|---|
| 2016/0127896 | A1* | 5/2016 | Lee | H04W 12/06 455/411 |
| 2018/0352501 | A1* | 12/2018 | Zhang | H04W 76/11 |
| 2018/0359688 | A1* | 12/2018 | An | H04W 74/006 |
| 2019/0021047 | A1* | 1/2019 | Zong | H04W 8/26 |
| 2019/0028941 | A1* | 1/2019 | Zee | H04W 36/0066 |

OTHER PUBLICATIONS

"3rd Generation Partnership Project; Technical Specification Group Services and System Aspects; Study on Architecture for Next Generation System (Release 14)", 3GPP TR 23.799 V0.3.0, (Mar. 2016), pp. 1-52.

Huawei, HiSilicon, "Network slicing considerations", 3GPP TSG-RAN WG2 Meeting #93bis, R2-162664, Section 2, Apr. 11, 2016, pp. 1-4.

Huawei, HiSilicon, Alcatel-Lucent, Alcatel-Lucent Shanghai Bell, Verizon, Intel, Enhancements to the EPS attach procedure for CIoT, 3GPP TSG CT #71, CP-160158, Section 5.5.1.2.4, Mar. 7, 2016, pp. 1-23.

International Search Report issued in PCT/JP2017/013931, dated Jun. 20, 2017.

NTT DOCOMO, "Solution to support a UE with simultaneous connections to multiple Network Slices", 3GPP TSG-SA, SA WG2 Meeting #113AH, S2-161328, Feb. 23, 2016, pp. 1-4.

Written Opinion of the International Searching Authority issued in PCT/JP2017/013931 (PCT/ISA/237), dated Jun. 20, 2017.

ZTE Corporation, China Unicom, "update the network slicing use case in Smarter", 3GPP TSG-SA WG1 Meeting #71, S1-152074, section 5.2.1, Aug. 17, 2015, pp. 1-3.

3GPP, "3rd Generation Partnership Project; Technical Specification Group Services and System Aspects; Study on Architecture for Next Generation System (Release 14)," 3GPP TR 23.799, V0.3.0, Mar. 2016, pp. 1-52.

Office Action issued by the Chinese Patent Office in related CN Application No. 201780017188.2, dated Apr. 21, 2021 (9 pgs.).

3GPP TR 23.711 V0.2.0 (Nov. 2015); 3rd Generation Partnership Project; Technical Specification Group Services and System Aspects; Enhancements of Dedicated Core Networks selection mechanism; (Release 14) (20 pgs.).

3GPP TR 23.711 V0.3.0 (Jan. 2016); 3rd Generation Partnership Project; Technical Specification Group Services and System Aspects; Enhancements of Dedicated Core Networks selection mechanism; (Release 14) (31 pgs.).

Notification of Reason for Refusal issued by the Korean Patent Office in related KR Application No. 10-2018-7031925, dated May 22, 2021 (9 pgs.).

The extended European search report pursuant to Rule 62 EPC, the supplementary European search report (Art. 153(7) EPC) and the European search opinion; dated Oct. 28, 2019 (8 pgs.).

* cited by examiner

FIG. 4A

| IMSI |
|---|
| EMM State |
| GUTI |
| ME Identity |
| UE usage type |

FIG. 4B

| PDN connection id |
|---|
| Application ID |
| APN |
| IP Address |
| Default Bearer |
| Network slice type |
| Network slice ID |
| isolation level |

| MME IDENTIFICATION INFORMATION | Network slice type | Network slice ID | Isolation level |
|---|---|---|---|
| GUMMEI (MME_A) | Type1 | ID1 | Level 2 |
| GUMMEI (MME_B) | type2 | ID2 | Level 2 |
| GUMMEI (MME_C) | type3 | ID3 | Level 2 |
| GUMMEI (MME_D) | type1 | ID1 | Level 1 |
| GUMMEI (MME_D) | type2 | ID2 | Level 1 |

| MME CONTEXT FOR EACH UE |
|---|
| MME CONTEXT FOR EACH PDN CONNECTION |
| MME CONTEXT FOR EACH BEARER |

| Network Slice type | isolation level |
|---|---|
| type1 | isolation level2 |
| type2 | isolation level2 |

| Network Slice ID | isolation level |
|---|---|
| ID 1 | isolation level2 |
| ID 2 | isolation level2 |

TERMINAL APPARATUS, BASE STATION APPARATUS, MOBILITY MANAGEMENT ENTITY (MME), AND COMMUNICATION CONTROL METHOD

TECHNICAL FIELD

The present invention relates to a terminal apparatus, a base station apparatus, a Mobility Management Entity (MME), and a communication control method.

BACKGROUND ART

The 3rd Generation Partnership Project (3GPP), which undertakes activities for standardizing recent mobile communication systems, discusses System Architecture Enhancement (SAE), which is system architecture of the Long Term Evolution (LTE). The 3GPP is in the process of creating specifications for the Evolved Packet System (EPS) as a communication system which realizes an all-IP architecture. Note that a core network configuring the EPS is called an Evolved Packet Core (EPC).

Additionally, the 3GPP recently discusses New Services and Markets Technology (SMARTER) and an Architecture for Next Generation System (NextGen) as a discussion on a next-generation communication technology for various kinds of terminals.

The SMARTER is in the process of extracting requirements based on use cases of diversifying services, and the NextGen extracts technical problems for connecting various kinds of terminals to a cellular network and creates specifications of a solution.

For example, in the SMARTER and the NextGen, since each of the diversifying services or terminals requires different performance of communication, Network Slicing in which a single PLMN core network is logically divided into multiple slices has been discussed.

CITATION LIST

Non Patent Literature

NPL 1: 3rd Generation Partnership Project; Technical Specification Group Services and System Aspects; Feasibility Study on New Services and Markets Technology Enablers; Stage 1 (Release 14)
NPL 2: 3rd Generation Partnership Project; Technical Specification Group Services and System Aspects; Study on Architecture for Next Generation System (Release 14)

SUMMARY OF INVENTION

Technical Problem

In the 3GPP, as a part of the SMARTER and the NextGen, the Network Slicing in which a core network is logically sliced has been discussed.

However, a specific definition of the Network slice and a procedure of a connection method to a core network divided by the Network slice are not made clear.

The present invention has been made in view of the above described situations, and an object thereof is to provide a communication control technique for data transmission and/or reception suitable for Network Slicing.

Solution to Problem

In order to solve the above-described problems, a communication control method of a terminal apparatus according to the present invention includes the steps of: starting an attach procedure by transmitting an attach request message to a base station apparatus; receiving, in the attach procedure, an attach accept message including at least a first Activate Default EPS bearer context Request message and a second Activate Default EPS bearer context Request message from a Mobility Management Entity (MME); and connecting to a first network slice and a second network slice based on completion of the attach procedure.

A communication control method of a terminal apparatus according to the present invention includes the steps of: starting an attach procedure by transmitting an attach request message to a base station apparatus; receiving, in the attach procedure, an attach accept message including at least a first Activate Default EPS bearer context Request message from a first Mobility Management Entity (MME); connecting to a first network slice based on completion of the attach procedure; starting, after the completion of the attach procedure, a Packet DataNetwork (PDN) connectivity procedure; receiving, in the PDN connectivity procedure, a second Activate Default EPS bearer context Request message from a second MME; and connecting to a second network slice based on completion of the PDN connectivity procedure.

A communication control method of a base station apparatus according to the present invention includes the steps of: receiving an attach accept message including at least a first Activate Default EPS bearer context Request message and a second Activate Default EPS bearer context Request message from a Mobility Management Entity (MME); and transmitting the attach accept message to a terminal apparatus.

A communication control method of a Mobility Management Entity (MME) according to the present invention includes the step of: transmitting an attach accept message including at least a first Activate Default EPS bearer context Request message and a second Activate Default EPS bearer context Request message to a base station apparatus.

A terminal apparatus according to the present invention includes: a controller configured to start an attach procedure by transmitting an attach request message to a base station apparatus; and a transmission and/or reception unit configured to receive, in the attach procedure, an attach accept message including at least a first Activate Default EPS bearer context Request message and a second Activate Default EPS bearer context Request message from a Mobility Management Entity (MME), in which the controller performs a connection to a first network slice and a second network slice based on completion of the attach procedure.

A terminal apparatus according to the present invention includes: a controller configured to start an attach procedure by transmitting an attach request message to a base station apparatus; and a transmission and/or reception unit configured to receive, in the attach procedure, an attach accept message including at least a first Activate Default EPS bearer context Request message from a first Mobility Management Entity (MME), in which the controller performs a connection to a first network slice based on completion of the attach procedure; the controller starts, after the completion of the attach procedure, a Packet DataNetwork (PDN) connectivity procedure; the transmission and/or reception unit receives, in the PDN connectivity procedure, a second Activate Default EPS bearer context Request message from a second MME; and the controller performs a connection to a second network slice based on completion of the PDN connectivity procedure.

A base station apparatus according to the present invention includes: a transmission and/or reception unit configured to receive an attach accept message including at least a first Activate Default EPS bearer context Request message and a second Activate Default EPS bearer context Request message from a Mobility Management Entity (MME), in which the transmission and/or reception unit transmits the attach accept message to a terminal apparatus.

A Mobility Management Entity (MME) according to the present invention includes: a transmission and/or reception unit configured to transmit an attach accept message including at least a first Activate Default EPS bearer context Request message and a second Activate Default EPS bearer context Request message to a base station apparatus.

Advantageous Effects of Invention

According to the present invention, a terminal is capable of attaching a network slice based on terminal performance, an application, or a service, and is capable of communicating.

BRIEF DESCRIPTION OF DRAWINGS

FIGS. 2A and 2B are diagrams illustrating an example of a configuration of an IP mobile communication network, and the like.

FIGS. 4A and 4B are diagrams illustrating a storage unit of the UE.

DESCRIPTION OF EMBODIMENTS

Hereinafter, a preferred embodiment for carrying out the present invention will be described with reference to the drawings. Note that as an example, the present embodiment describes an embodiment of a mobile communication system to which the present invention is applied.

1. First Embodiment 1.1. System Overview

Figure 1:
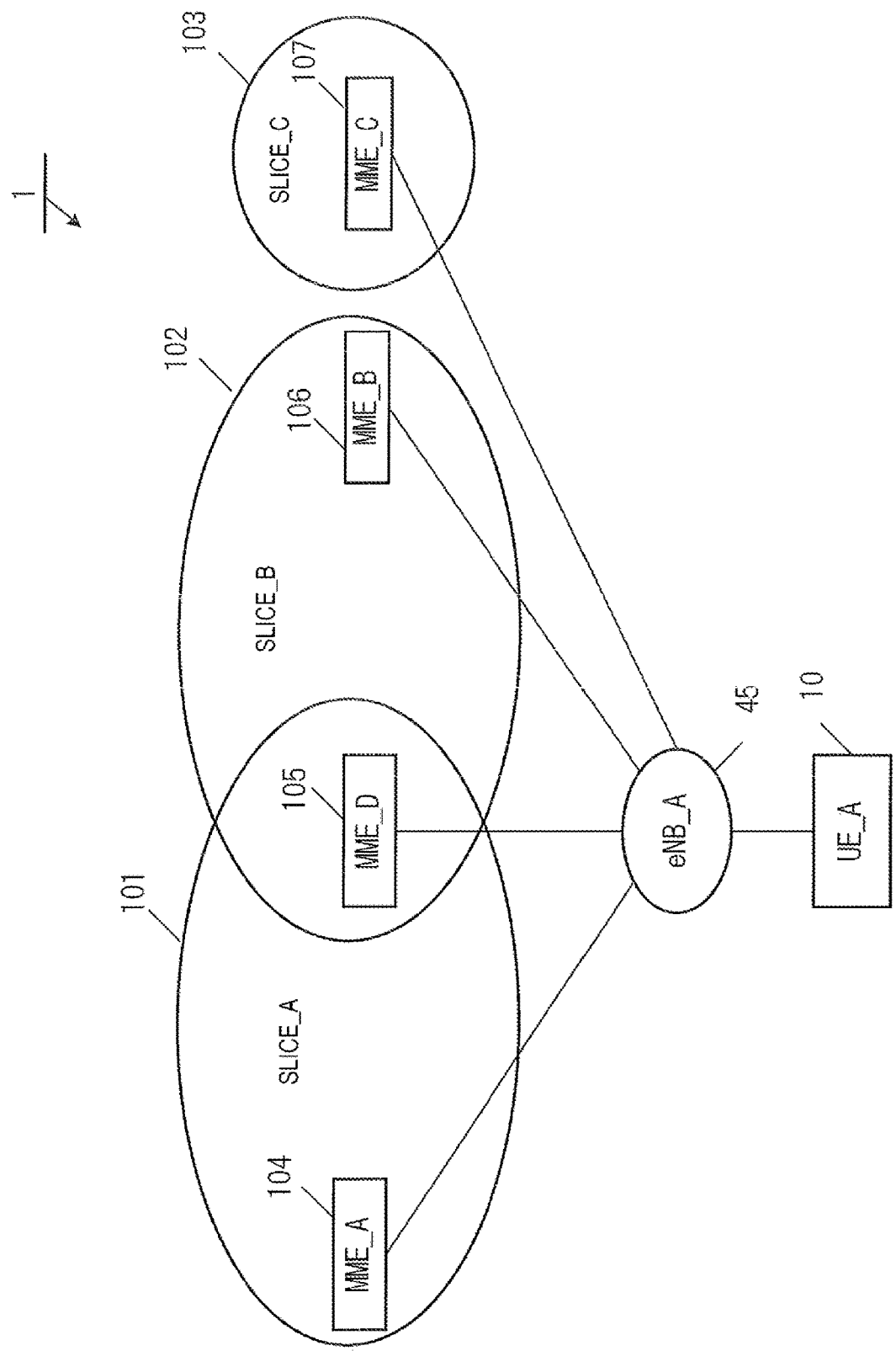
FIG. 1 is a diagram illustrating an overview of a mobile communication system.

FIG. 1 is a diagram illustrating an overview of a mobile communication system according to the present embodiment. A mobile communication system may be configured by including one or multiple Network slices. For example, as illustrated in the drawing, the mobile communication system 1 may be configured of a Network slice_A 101, a Network slice_B 102, a Network slice_C 103, a base station eNB_A 45, and terminal apparatus UE (User Equipment)_A 10.

Additionally, in the mobile communication system, one or multiple Network Functions (NFs) may be configured. Here, the NF is a function unit in a network, hardware may be independent for each NF, and multiple NFs implemented by software may configure one piece of hardware.

Here, the Network slice may be configured by including one or multiple Network Functions (NFs). Additionally, the configuring NFs may be different for the respective Network slices.

Alternatively, the Network slice is a network that is customized in order for an operator to provide a solution that is optimized for scenarios of different business markets. In other words, the Network slice is a network obtained by dividing a network of the operator into multiple slices in order to solve a functional request that is different for each of the scenarios or services. In other words, the Network slice may be a network obtained by slicing functions included in one Public Land mobile Network (PLMN) based on the service and/or the terminal characteristics and performance. The Network slice may be linked with an Application ID and/or the service performance. In other words, the operator can configure one or multiple Network slices.

Additionally, the Network slice may be a network obtained by dividing a core network_A 90 into multiple slices, and in other words, the core network_A 90 may be configured of the Network slice_A 101, the Network slice_B 102, and the Network slice_C 103.

Here, the requests requested by the scenarios of the different business markets and the functional requests that are different for the respective scenarios are requests in a range of functionality, performance, and independence. For example, a request to charging, a request to policy control, a request to moving, or the like are included. Alternatively, a request to a communication rate, reliability of data transmission and/or reception, or the like may be included.

For example, the Network slice_A 101 may be a Network slice for an IoT device having a low function such as a sensor, and the Network slice_B 102 may be a Network slice for communication of a service regarding to a vehicle. However, the Network slices are not limited to these types, and may be configured based on requirements that are requested.

Note that the Network Slice may be managed as a Network Slice Instance. In other words, information for identifying the Network slice may be identification information on the Network slice Instance such as a Network Slice Instance ID.

Additionally, a Network Slice type may be allocated to each of these Network slices. Specifically, a Network Slice type_A may be allocated to the Network slice_A 101, a Network Slice type_B may be allocated to the Network slice_B 102, and a Network Slice type_C may be allocated to the Network slice_C 103.

Here, the Network Slice type may be identification information indicating performance of the Network slice. Specifically, the Network Slice type_A may be identification information indicating that the Network slice is for an IoT device having a low function such as a sensor.

The Network Slice type may be common among the operators. Alternatively, the Network Slice type may be independent for each of the operators. For example, the Network Slice types may be capable of being used such that some types are common among the operators and some types are independent for each of the operators.

Note that the operator may configure one or multiple Network slices for each of the Network Slice types. In other words, for example, the Network slices classified as the Network Slice type_A may be the Network slice_A and the Network slice_B, and the Network slice classified as the Network Slice type_B may be the Network slice_C.

Alternatively, the operator may configure one or multiple Network Slice types for each of the Network slices. In other words, for example, the Network slice_A may be included in the Network Slice type_A and the Network Slice type_B, and the Network slice_B may be included only in the Network Slice type_C.

Additionally, as illustrated in the drawing, in the Network slice_A 101, a mobility management device Mobility Management Entity (MME)_A 104 and an MME_D 105 are configured. In the Network slice_A 101, other multiple MMEs may be included.

On the other hand, in the Network slice_B 102, the MME_D 105 and an MME_B 106 are configured. Furthermore, in the Network slice_C 103, an MME_C 107 is configured.

In other words, the MME_A 104 supports only a terminal apparatus (UE) connected to the Network slice_A 101, and the MME_D 105 can support the terminal apparatus connected to the Network slice_A 101 and a terminal apparatus connected to the Network slice_B 102. In other words, the MME_D 105 is shared by the Network slice_A 101 and the Network slice_B 102.

In other words, in the Network slice_A 101, the MME_A 104 that is independent in the Network slice_A 101 and the MME_D 105 that is not independent in the Network slice_A are included and configured.

Figure 2A:
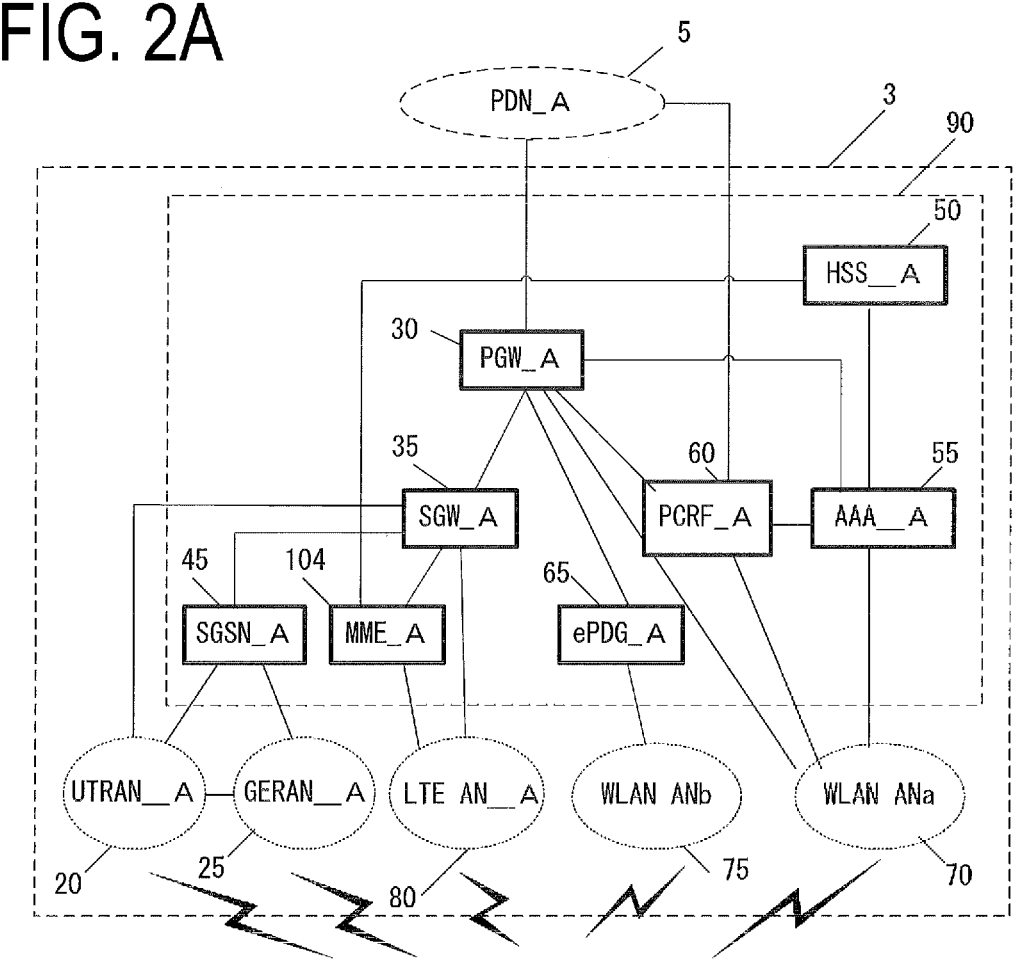
Figure 2B:
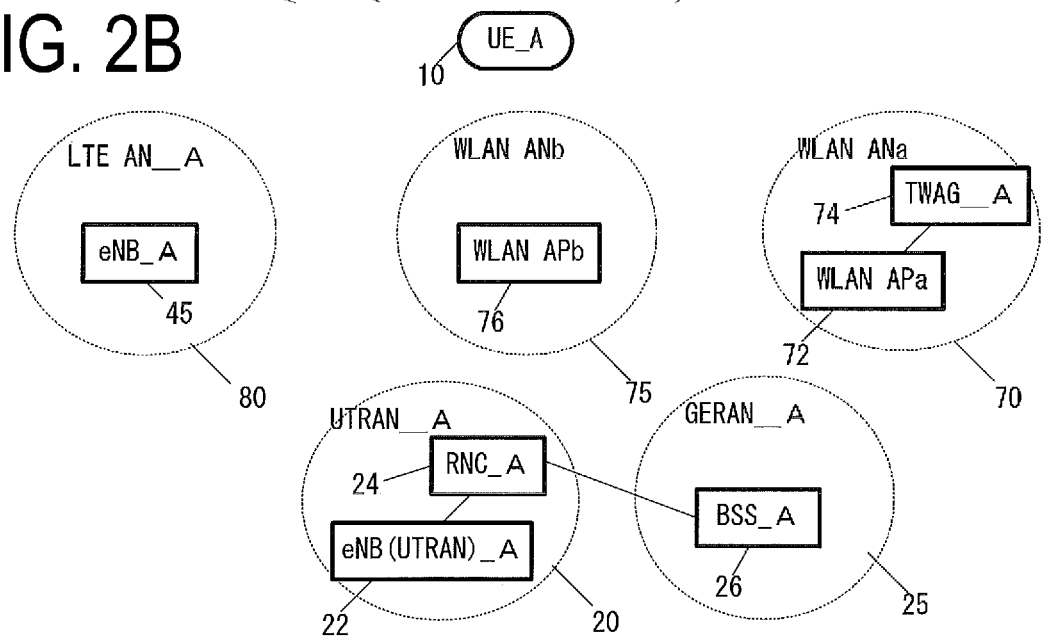

Note that in the diagram, although only the MMEs are illustrated in the respective Network slices, function units such as a gateway or the like illustrated in FIGS. 2A and 2B, such as a Serving Gateway (SGW), a Packet Data Network Gateway (PGW), or the like, may be included.

That is, in other words, in the Network slice_A 101, an SGW_A that is independent of other Network slices and an SGW_B that is not independent of other Network slices may be configured, and in the same manner, a PGW_A that is independent for each of the Network slices and an PGW_B that is not independent for each of the Network slices may be configured.

Additionally, all the function units such as the MME, the SGW, the PGW, and the like included in the core network may be the Network Function (NF).

The eNB_A 45 is a base station apparatus of LTE connected to the sliced core network. As illustrated in the drawing, the eNB_A 45 may be the base station apparatus of LTE, which connects to multiple Network slices.

Additionally, the UE_A 10 may be any wirelessly connectable terminal apparatus, and may be User equipment (UE), Mobile equipment (ME), or a Mobile Station (MS).

Additionally, the UE_A 10 may be a radio communication terminal for providing communication regarding to a vehicle or a vehicle attached to a vehicle, may be a measurement device such as a sensor, a meter, or a radio communication terminal attached thereto, or may be a smartphone.

In the drawing, although only the UE_A 10 is included in the mobile communication system 1, multiple terminal apparatuses may be included in the mobile communication system 1.

Additionally, it is sufficient that the MME is a function unit handling control information with the UE, the MME may be used as the Network Function.

Next, FIGS. 2A and 2B illustrate an example of a configuration of the core network_A 90. FIGS. 2A and 2B are simply illustrated, and in the core network_A 90, each of the function units is configured at least one by one. That is, in other words, in the core network_A 90 in FIGS. 2A and 2B, although only the MME_A 104 is configured as the MME, the MME_B 106, the MME_C 107, and the MME_D 105 in FIG. 1 may further be configured.

The core network_A 90 in FIG. 2A is configured of a Home Subscriber Server (HSS)_A 50, an Authentication, Authorization, Accounting (AAA)_A 55, a Policy and Charging Rules Function (PCRF)_A 60, a PGW_A 30, an enhanced Packet Data Gateway (ePDG)_A 65, an SGW_A 35, the MME_A 104, and a Serving GPRS Support Node (SGSN)_A 42.

Note that the one or multiple function units configured in the core network_A 90 may be configured as one function unit. Alternatively, each of the function units may be divided into multiple function units for each requested function. Each of these function units may be the Network Function (NF).

Furthermore, the core network_A 90 is capable of connecting to multiple radio access networks (an LTE AN_A 80, a WLAN ANb 75, a WLAN ANa 70, a UTRAN_A 20, and a GERAN_A 25).

Such a radio access network may be configured by connecting to multiple different access networks, or may be configured by connecting to either one of the access networks. Moreover, the UE_A 10 is capable of wirelessly connecting to the radio access network.

Moreover, a WLAN Access Network b (WLAN ANb 75) that connects to the core network via the ePDG_A 65 and a WLAN Access Network a (WLAN ANa 75) that connects to the PGW_A, the PCRF_A 60, and the AAA_A 55 can be configured as access networks connectable in a WLAN access system.

Note that each device has a similar configuration to those of the devices of the related art in a mobile communication system using EPS, and thus detailed descriptions thereof will be omitted. Each device will be described briefly hereinafter.

The PGW_A 30 is connected to a PDN_A 5, the SGW_A 35, the ePDG_A 65, the WLAN ANa 70, the PCRF_A 60, and the AAA_A 55, and serves as a relay device configured to transfer user data by functioning as a gateway device between the PDN_A 5 and the core network_A 90.

The SGW_A 35 is connected to the PGW 30, the MME_A 104, the LTE AN 80, the SGSN_A 42, and the UTRAN_A 20, and serves as a relay device configured to transfer user data by functioning as a gateway device between the core network_A 90 and the 3GPP access network (the UTRAN_A 20, the GERAN_A 25, the LTE AN_A 80).

The MME_A 104 is connected to the SGW_A 35, the LTE AN 80, and the HSS_A 50, and serves as an access control device configured to perform location information management and access control for the UE_A 10 via the LTE AN 80. Furthermore, the core network_A 90 may include multiple location management devices. For example, a location management device different from the MME_A 104 may be configured. As with the MME_A 104, the location management device different from the MME_A 104 may be connected to the SGW_A 35, the LTE AN 80, and the HSS_A 50.

Furthermore, in a case that multiple MMEs are included in the core network_A 90, the MMEs may be connected to each other. With this configuration, the context of the UE_A 10 may be transmitted and/or received between the MMEs.

The HSS_A 50 is connected to the MME_A 104 and the AAA_A 55 and serves as a managing node that manages subscriber information. The subscriber information of the HSS_A 50 is referred to during MME_A 104 access control, for example. Moreover, the HSS_A 50 may be connected to the location management device different from the MME_A 104.

The AAA_A 55 is connected to the PGW 30, the HSS_A 50, the PCRF_A 60, and the WLAN ANa 70, and is configured to perform access control for the UE_A 10 connected via the WLAN ANa 70.

The PCRF_A 60 is connected to the PGW_A 30, the WLAN ANa 75, the AAA_A 55, and the PDN_A 5, and is configured to perform QoS management on data delivery. For example, the PCRF_A 60 manages QoS of a communication path between the UE_A 10 and the PDN_A 5.

The ePDG_A 65 is connected to the PGW 30 and the WLAN ANb 75 and is configured to deliver user data by functioning as a gateway device between the core network_A 90 and the WLAN ANb 75.

The SGSN_A 42 is connected to the UTRAN_A 20, the GERAN_A 25, and the SGW_A 35 and is a control device for location management between a 3G/2G access network (UTRAN/GERAN) and the LTE access network (E-UTRAN). In addition, the SGSN_A 42 has functions of: selecting the PGW and the SGW; managing a time zone of the UE; and selecting the MME at the time of handover to the E-UTRAN.

Additionally, as illustrated in FIG. 2B, each radio access network includes devices to which the UE_A 10 is actually connected (such as a base station apparatus and an access point device), and the like. The devices used in these connections can be thought of as devices adapted to the radio access networks.

In the present embodiment, the LTE AN_A 80 includes the eNB_A 45. The eNB_A 45 is a radio base station to which the UE_A 10 connects in an LTE access system, and the LTE AN_A 80 may include one or multiple radio base stations. Note that the LTE AN_A 80 may be an access network not only for LTE, but also for radio communication of the 5G or later.

The WLAN ANa 70 includes a WLAN APa 72 and a TWAG_A 74. The WLAN APa 72 is a radio base station to which the UE_A 10 connects in the WLAN access system trusted by the operator running the core network_A 90, and the WLAN ANa 70 may include one or multiple radio base stations. The TWAG_A 74 serves as a gateway device between the core network_A 90 and the WLAN ANa 70. The WLAN APa 72 and the TWAG_A 74 may be configured as a single device.

Even in a case that the operator running the core network_A 90 and the operator running the WLAN ANa 70 are different, such a configuration can be implemented through contracts and agreements between the operators.

Furthermore, the WLAN ANb 75 is configured to include a WLAN APb 76. The WLAN APb 76 is a radio base station to which the UE_A 10 connects in the WLAN access system in a case that no trusting relationship is established with the operator running the core network_A 90, and the WLAN ANb 75 may include one or multiple radio base stations.

In this manner, the WLAN ANb 75 is connected to the core network_A 90 via the ePDG_A 65, which is a device included in the core network_A 90, serving as a gateway. The ePDG_A 65 has a security function for ensuring security.

The UTRAN_A 20 includes a Radio Network Controller (RNC)_A 24 and an eNB (UTRAN)_A 45. The eNB (UTRAN)_A 45 is a radio base station to which the UE_A 10 connects through a UMTS Terrestrial Radio Access (UTRA), and the UTRAN_A 20 may include one or multiple radio base stations. Furthermore, the RNC_A 24 is a controller configured to connect the core network_A 90 and the eNB (UTRAN)_A 45, and the UTRAN_A 20 may include one or multiple RNCs. Moreover, the RNC_A 24 may be connected to one or multiple eNBs (UTRANs)_A 45. In addition, the RNC_A 24 may be connected to a radio base station (Base Station Subsystem (BSS)_A 26) included in the GERAN_A 25.

The GERAN_A 25 includes the BSS_A 26. The BSS_A 26 is a radio base station to which the UE_A 10 connects through GSM (trade name)/EDGE Radio Access (GERA), and the GERAN_A 25 may be constituted of one or multiple radio base station BSSs. Furthermore, the multiple BSSs may be connected to each other. Moreover, the BSS_A 26 may be connected to the RNC_A 24.

Note that herein, the UE_A 10 being connected to radio access networks refers to the UE_A 10 being connected to a base station apparatus, an access point, or the like included in each of the radio access networks, and data, signals, and the like being transmitted and/or received also pass through those base station apparatuses, access points, or the like.

1.2. Device Configuration

The configuration of each device will be described below.

1.2.1. Configuration of UE

Figure 3:
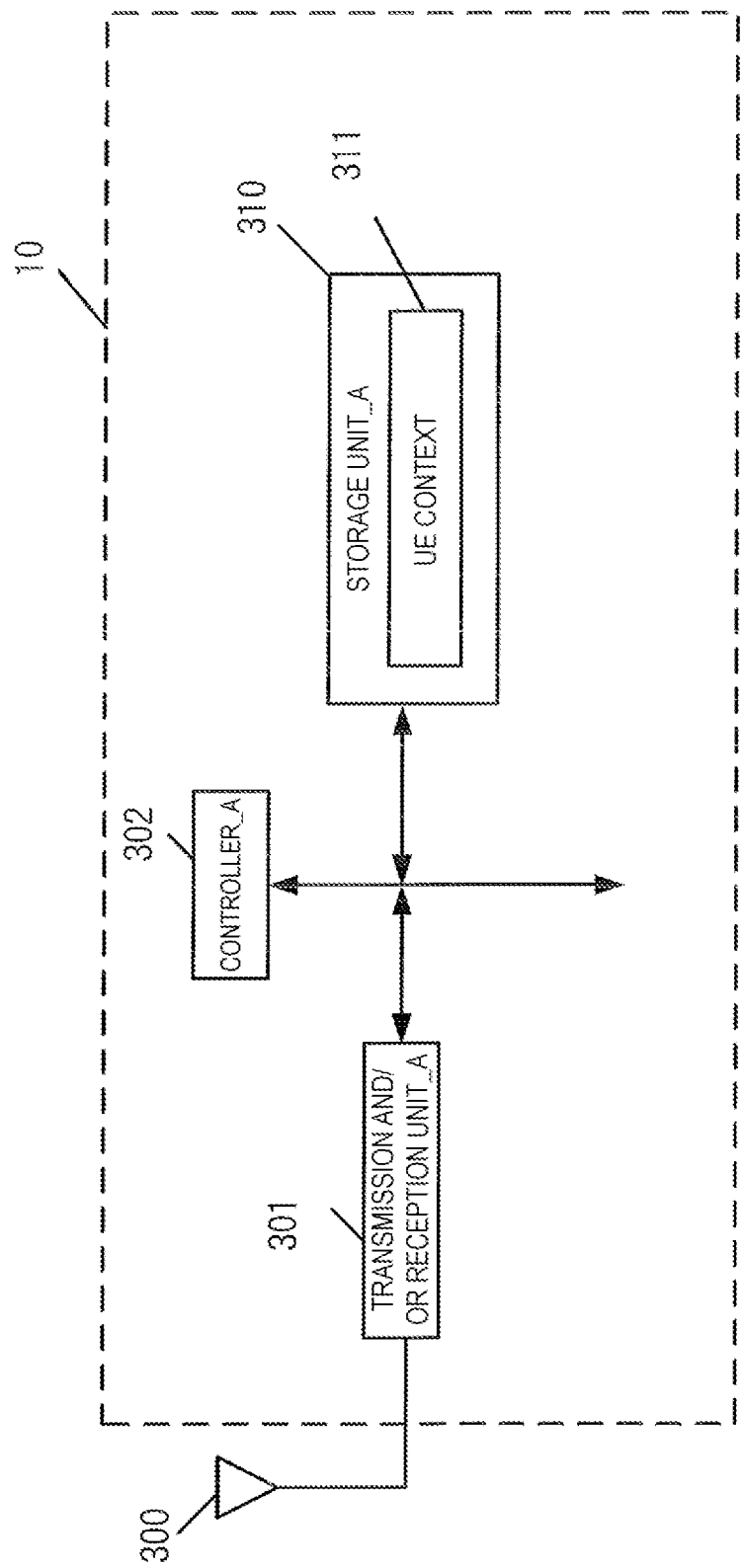
FIG. 3 is a diagram illustrating a device configuration of UE.

Next, the configuration of the UE_A 10 will be described. FIG. 3 illustrates a device configuration of the UE_A 10. As illustrated in the drawing, the UE_A 10 includes an antenna_A 300, a transmission and/or reception unit_A 301, a controller A 302, and a storage unit_A 310.

In the UE_A 10, the transmission and/or reception unit_A 301 and the storage unit_A 310 are connected to the controller_A 302 via a bus.

The controller_A 302 is a function unit to control the UE_A 10. The controller_A 302 is a function unit configured to read out and perform various kinds of programs stored in the storage unit_A 310.

The transmission and/or reception unit_A 301 is a function unit configured to transmit and/or receive radio communication data. The transmission and/or reception unit_A 301 is configured of a transmitter and a receiver; the transmitter can transmit control information through a base station, and the receiver can transmit data or control information through the base station.

The storage unit_A 310 is a function unit configured to store programs, data, and the like necessary for each operation of the UE_A 10. The storage unit_A 310 is constituted of, for example, a semiconductor memory, a Hard Disk Drive (HDD), or the like.

Furthermore, the storage unit_A 310 stores a UE context 311. The UE context 311 may be a context information group associated with a terminal apparatus. The UE context 311 at least includes a UE context for each UE and a UE context for each PDN connection.

FIGS. 4A and 4B illustrate an example of the UE context 311. FIG. 4A illustrates the UE context for each UE. As illustrated in FIG. 4A, the UE context for each UE is at least configured to include an IMSI, and an ME Identity. Furthermore, the UE context for each UE may be configured to include an EMM State, a GUTI, and a UE usage type.

The International Mobile station Equipment Identity (IMSI) is identification information to be assigned to a user (subscriber) using the UE_A 10. The IMSI may be identification information indicating a line contract, and may be stored in a SIM card.

The ME Identity is an ID of an ME, and may be International Mobile station Equipment Identity and Software Version Number (IMEI/IMISV), for example. Additionally, here, the ME may be UE.

The EMM State indicates a mobility management state of the UE. For example, the EMM State may be EMM-REGISTERED in which the UE is registered with the network (registered state) or EMM-DEREGISTERD in which the UE is not registered with the network (deregistered state).

The GUTI is an abbreviation of "Globally Unique Temporary Identity," and is temporary identification information on the UE_A 10. The GUTI is configured of the identification information (Globally Unique MME Identifier (GUMMEI)) on an MME (e.g. the MME_A 104) and the identification information (M-TMSI) on the UE_A 10 in a specific MME (e.g. the MME_A 104). The UE context for each UE may store multiple GUTIs for each service.

The UE usage type is identification information, which is used for selecting a Dedicated core network to which the UE connects, stored for each UE. The UE or the network may select the Dedicated core network to which the UE connects based on this information.

Additionally, the UE usage type may be identification information, which is used for selecting a Network slice to which the UE connects, stored for each UE. The UE and/or the network may select the Network slice to which the UE connects based on this information. In this case, multiple UE usage types may be stored in the storage unit. Furthermore, the UE usage type may be stored while being linked with application identification information or service identification information.

Next, FIG. 4B illustrates the UE context for each PDN connection. As illustrated in the drawing, the UE context for each PDN connection is configured for including a PDN connection ID, an Application ID, an APN, an IP address, a Default bear, a Network Slice type, a Network Slice ID, and an isolation level.

The PDN connection ID is identification information for identifying a PDN connection.

The Application ID is information identifying an application that this PDN connection can be used. The storage unit may store multiple Application IDs.

The APN indicates a connection destination of the UE_A 10. This APN may be constituted of identification information on the network and identification information on a default operator.

The IP Address is an IP address assigned to the UE_A 10 for the PDN connection, and may be an IPv4 address or an IPv6 prefix.

The Default Bearer is EPS bearer identification information for identifying a default bearer in this PDN connection.

The Network Slice type is identification information for identifying a type of a Network slice that is connected in this PDN connection, and identification information, which is used for selecting a Network slice to which the UE connects, stored for each UE or each PDN connection. The UE may select the Network slice to which the UE connects based on this information. The Network Slice type may be the UE usage type. At this time, multiple Network slices may be linked with the UE_A 10.

Alternatively, the Network Slice type may be included in the UE usage type. At this time, multiple Network slice Types may be included in one UE usage type.

Alternatively, the Network Slice type may be information independent of the UE usage type, and may be information for further restricting the Network slice to which the UE connects. At this time, multiple Network Slice types may be linked with one UE usage type.

The Network Slice identification information (Network Slice ID) is identification information for identifying a Network slice that is connected in this PDN connection, and identification information, which is used for selecting a Network slice to which the UE connects, stored for each UE. The UE may select the Network slice to which the UE connects based on this information. The Network Slice ID may be the UE usage type. At this time, multiple Network slices may be linked with the UE_A 10.

Alternatively, the Network Slice ID may be included in the UE usage type. At this time, multiple Network slice IDs may be included in one UE usage type.

Alternatively, the Network Slice ID may be information independent of the UE usage type, and may be information for further restricting the Network slice to which the UE connects. At this time, multiple Network Slice IDs may be linked with one UE usage type.

Additionally, multiple Network Slices may belong to one Network Slice type, or one Network Slice may belong to multiple Network Slice types. The isolation level may be information indicating a degree of independence of a connection. In other words, the isolation level is information indicating an independence level with respect to other Network slices. Specifically, for example, in a case that the Network slice_A makes all the function units independent of other Network slices, the UE connecting to the Network slice_A may mean that the UE has established a connection with the isolation level of a level 2. Alternatively, a case that some function units of the network slice_A are shared with other Network slices, and a case that the UE uses the shared function unit in the Network slice_A may mean that the UE has established a connection with the isolation level of a level 1.

For example, in a case that the isolation level of the connection is the level 1, the function unit for control information is shared with other Network slices. Here, the function unit for the control information may be, for example, the MME. Alternatively, in a case that the Isolation level is the level 1, the SGW and/or the PGW may be shared with other Network slices.

Alternatively, the Isolation level may be information for identifying whether a radio resource such as a base station or the like is shared.

1.2.2. Configuration of eNB

Figures 5A, 5B:
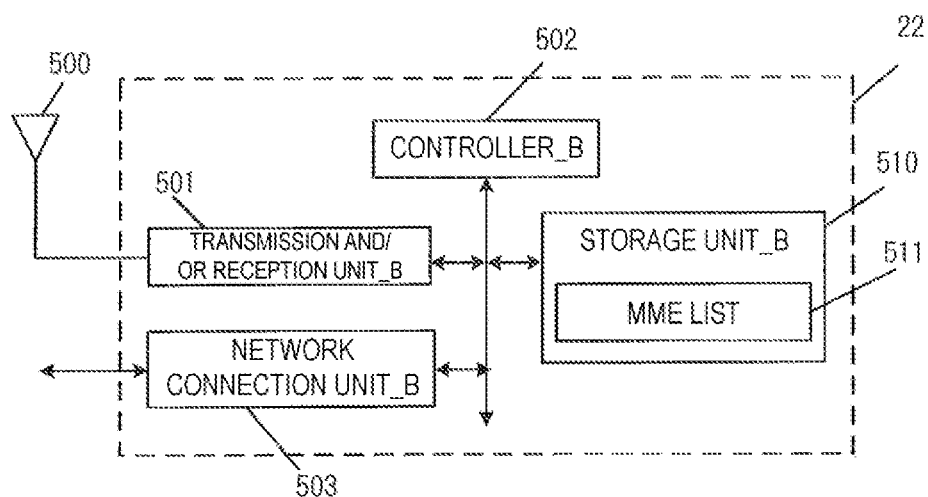
FIGS. 5A and 5B are diagrams illustrating a device configuration of an eNB.

The configuration of the eNB_A 45 will be described below. FIGS. 5A and 5B illustrate the device configuration of the eNB_A 45. As illustrated in the drawing, the eNB_A 45 includes an external antenna_B 500, a transmission and/or reception unit_B 501, a network connection unit_B 503, a controller_B 502, and a storage unit_B 510. The network connection unit_B 503, the transmission and/or reception unit_B 501, and the storage unit_B 510 are connected to the controller_B 502 via a bus.

The controller_B 502 is a function unit for controlling the eNB_A 45. The controller_B 502 implements various processes by reading out and performing various programs stored in the storage unit_B 510.

The network connection unit_B 503 is a function unit through which the eNB_A 45 connects to the MME_A 104 and/or the SGW_A 35 or a C-SGN_A 95. Furthermore, the network connection unit_B 503 is a transmission and/or reception function unit through which the eNB_A 45 transmits and/or receives the user data and/or control data to and/or from the MME_A 104 and/or the SGW_A 35 or the C-SGN_A 95.

The transmission and/or reception unit_B 501 is a function unit through which the eNB_A 45 connects to the UE_A 10. Furthermore, the transmission and/or reception unit_B 501 is a transmission and/or reception function unit for transmitting and/or receiving to and/or from the UE_A 10 the user data and/or the control data. Additionally, the external antenna_B 500 is connected to the transmission and/or reception unit_B 501.

The storage unit_B 510 is a function unit for storing programs, data, and the like necessary for each operation of the eNB_A 45. A storage unit 640 is constituted of, for example, a semiconductor memory, a Hard Disk Drive (HDD), or the like.

The storage unit_B 510 includes at least an MME list 511. The MME list 511 is a list of the MME to which the eNB_A 45 connects, and may be an MME pool.

FIG. 5B illustrates an example of the MME list 511. As illustrated in the drawing, the eNB_A 45 may store a Globally Unique MME Identifier (GUMMEI) as MME identification information. Additionally, the eNB_A 45 may store the MME identification information in association with information for identifying the Network slice type, the Network Slice ID, and the Isolation level supported by each MME.

Note that the Network Slice Type supported by the MME refers to a Network Slice Type with which the Network Slice in which the MME is included is linked.

Furthermore, the Network Slice supported by the MME refers to a Network Slice in which the MME is included.

Additionally, the storage unit_B 510 may store at least the identification information and/or the control information and/or a flag and/or a parameter included in the control message transmitted and/or received in a communication procedure, which will be described later.

1.2.3. Configuration of MME

Next, the constitution of the MME_D 105 will be described. Note that the MME_A 104, the MME_B 106, and the MME_C 107 may also have the same configuration. FIGS. 6A to 6D illustrate the device configuration of the MME_D 105. As illustrated in the drawings, the MME_D 105 includes a network connection unit_C 601, a controller_C 602, and a storage unit_C 610. The network connection unit_C 601 and the storage unit_C 610 are connected to the controller_C 602 via a bus.

The controller_C 602 is a function unit for controlling the MME_D 105. The controller_C 602 implements various processes by reading out and performing various programs stored in the storage unit_C 610.

The network connection unit_C 601 is a function unit through which the MME_D 105 connects to the eNB_A 45 and/or the HSS_A 50 and/or the SGW_A 35. Furthermore, the network connection unit_B 601 is a transmission and/or reception function unit through which the MME_D 105 transmits and/or receives to and/or from the eNB_A 45 and/or the HSS_A 50 and/or the SGW_A 35 the user data and/or the control data.

The storage unit_C 610 is a function unit for storing programs, data, and the like necessary for each operation of the MME_D 105. The storage unit_C 610 is configured of, for example, a semiconductor memory, a Hard Disk Drive (HDD), or the like.

The storage unit_C 610 may store at least the identification information and/or the control information and/or the flag and/or the parameter included in the control message transmitted and/or received in the communication procedure, which will be described later.

The storage unit_C 610 stores, as illustrated in the drawings, an MME context 611, a Network Slice type 612, and a Network Slice ID 613. Note that the MME context 611 includes an MM context and an EPS bearer context. Alternatively, the MME context may include an EMM context and an ESM context. The MM context may be the EMM context, the EPS bearer context may be the ESM context.

The MME context stored for each UE includes an IMSI, an IMSI-unauthenticated-indicator, an MSISDN, an MM State, a GUTI, an ME Identity, a Tracking Area List, a TAI of last TAU, an E-UTRAN Cell Global Identity (ECGI), an E-UTRAN Cell Identity Age, a CSG ID, a CSG membership, an Access mode, an Authentication Vector, a UE Radio Access Capability, MS Classmark 2, MS Classmark 3, Supported Codecs, a UE Network Capability, an MS Network Capability, UE Specific DRX Parameters, a Selected NAS Algorithm, an eKSI, a K_ASME, NAS Keys and COUNT, a Selected CN operator ID, a Recovery, an Access Restriction, an ODB for PS parameters, an APN-OI Replacement, an MME IP address for S11, an MME TEID for S11, an S-GW IP address for S11/S4, an S GW TEID for S11/S4, an SGSN IP address for S3, an SGSN TEID for S3, an eNodeB Address in Use for S1-MME, an eNB UE S1AP ID, an MME UE S1AP ID, a Subscribed UE-AMBR, a UE-AMBR, EPS Subscribed Charging Characteristics, a Subscribed RFSP Index, an RFSP Index in Use, a Trace reference, a Trace type, a Trigger ID, an OMC identity, a URRP-MME, CSG Subscription Data, a LIPA Allowed, a Subscribed Periodic RAU/TAU Timer, an MPS CS priority, an MPS EPS priority, a Voice Support Match Indicator, and a Homogenous Support of IMS Voice over PS Sessions.

The IMSI is permanent identification information of a user. The IMSI is identical to the IMSI stored in the HSS_A 50.

The IMSI-unauthenticated-indicator is instruction information indicating that this IMSI is not authenticated.

MSISDN represents the phone number of UE. The MSISDN is indicated by the storage unit of the HSS_A 50.

The MM State indicates a Mobility management state of the MME. This management information indicates an ECM-IDLE state in which a connection between an eNB and the core network is released, an ECM-CONNECTED state in which the connection between the eNB and the core network is not released, or an EMM-DEREGISTERED state in which the MME does not store the location information of the UE, an EMM-REGISTERED state in which the MME stores the location information of the UE.

The Globally Unique Temporary Identity (GUTI) is temporary identification information about the UE. The GUTI includes the identification information about the MME (Globally Unique MME Identifier (GUMMEI)) and the identification information about the UE in a specific MME (M-TMSI).

The ME Identity is an ID of the UE, and may be the IMEI/IMISV, for example.

The Tracking Area List is a list of tracking area identification information which is assigned to the UE.

The TAI of last TAU is the tracking area identification information indicated by a recent tracking area update procedure.

The ECGI is cell identification information of the recent UE known by the MME_A 104.

The E-UTRAN Cell Identity Age indicates the elapsed time since the MME acquires the ECGI.

The CSG ID is identification information of a Closed Subscriber Group (CSG), in which the UE recently operates, known by the MME.

The CSG membership is member information of the CSG of the recent UE known by the MME. The CSG membership indicates whether the UE is the CSG member.

The Access mode is an access mode of a cell identified by the ECGI, and may be identification information indicating that the ECGI is a hybrid which allows access to both the UEs which is the CSG and is not the CSG.

The Authentication Vector indicates a temporary Authentication and Key Agreement (AKA) of a specific UE followed by the MME. The Authentication Vector includes a random value RAND used for authentication, an expectation response XRES, a key K_ASME, and a language (token) AUTN authenticated by the network.

The UE Radio Access Capability is identification information indicating a radio access capability of the UE.

MS Classmark 2 is a classification symbol (Classmark) of a core network of a CS domain of 3G/2G (UTRAN/GERAN). MS Classmark 2 is used in a case that the UE supports a Single Radio Voice Call Continuit (SRVCC) for the GERAN or the UTRAN.

MS Classmark 3 is a classification symbol (Classmark) of a radio network of the CS domain of the GERAN. MS Classmark 3 is used in a case that the UE supports the Single Radio Voice Call Continuit (SRVCC) for the GERAN.

The Supported Codecs are a code list supported by the CS domain. This list is used in a case that the UE supports the SRVCC for the GERAN or the UTRAN.

The UE Network Capability indicates a function supported by the UE. In other words, characteristics of the UE is indicated.

The MS Network Capability is information including at least one kind of information necessary for the SGSN to the UE having the GERAN and/or UTRAN function.

The UE Specific DRX Parameters are parameters used for determining a Discontinuous Reception (DRX) cycle length of the UE. Here, DRX is a function for changing the UE to a low-power-consumption mode in a case that there is no communication in a certain period of time, in order to reduce power consumption of a battery of the UE as much as possible.

The Selected NAS Algorithm is a selected security algorithm of a Non-Access Stream (NAS).

The eKSI is a key set indicating the K_ASME. The eKSI may indicate whether a security key acquired by a security authentication of the UTRAN or the E-UTRAN is used.

The K_ASME is a key for E-UTRAN key hierarchy generated based on a Cipher Key (CK) and an Integrity Key (IK).

The NAS Keys and COUNT includes a key K_NASint, a key K_NASenc, and a NAS COUNT parameter. The key K_NASint is a key for encryption between the UE and the MME, the key K_NASenc is a key for security protection between the UE and the MME. Additionally, the NAS COUNT is a count which starts a count in a case that a new key by which security between the UE and the MME is established is configured.

The Selected CN operator ID is identification information, which is used for sharing the network among operators, of a selected core network operator.

The Recovery is identification information indicating whether the HSS performs database recovery.

The Access Restriction is subscriber information for access restriction.

The ODB for PS parameters indicates a state of an operator determined barring (ODB). Here, ODB is an access rule determined by the network operator (operator).

The APN-OI Replacement is a domain name substituting for APN in a case that PGW FQDN is constructed in order to perform a DNS resolution. This substitute domain name is applied to all APNs.

The MME IP address for S11 is an IP address of the MME used for an interface with the SGW.

The MME TEID for S11 is a Tunnel Endpoint Identifier (TEID) used for the interface with the SGW.

The S-GW IP address for S11/S4 is an IP address of the SGW used for an interface between the MME and the SGW or between the SGSN and the MME.

The S GW TEID for S11/S4 is a TEID of the SGW used for the interface between the MME and the SGW or between the SGSN and the MME.

The SGSN IP address for S3 is an IP address of the SGSN used for the interface between the MME and the SGSN.

The SGSN TEID for S3 is a TEID of the SGSN used for the interface between the MME and the SGSN.

The eNodeB Address in Use for S1-MME is an IP address of the eNB recently used for an interface between the MME and the eNB.

The eNB UE S1AP ID is identification information of the UE in the eNB.

The MME UE S1AP ID is identification information of the UE in the MME.

The Subscribed UE-AMBR indicates the maximum value of a Maximum Bit Rate (MBR) of uplink communication and downlink communication for sharing all Non-Guaranteed Bit Rate (GBR) bearers (non-guaranteed bearers) in accordance with user subscriber information.

The UE-AMBR indicates the maximum value of the MBR of the uplink communication and the downlink communication which are recently used for sharing all the Non-GBR bearers (non-guaranteed bearers).

The EPS Subscribed Charging Characteristics indicate a charging performance of the UE. For example, the EPS Subscribed Charging Characteristics may indicate subscriber information such as normal, prepaid, a flat rate, hot billing, or the like.

The Subscribed RFSP Index is an index for a specific RRM configuration in the E-UTRAN acquired from the HSS.

The RFSP Index in Use is an index for the specific RRM configuration in the E-UTRAN which is recently used.

The Trace reference is identification information for identifying a specific trace record or a record set.

The Trace type indicates a type of the trace. For example, the Trace type may indicate a type traced by the HSS and/or a type traced by the MME, the SGW, or the PGW.

The Trigger ID is identification information for identifying a constituent element for which the trace starts.

The OMC Identity is identification information for identifying an OMC which receives the record of the trace.

The URRP-MME is identification information indicating that the HSS requests UE activity notification from the MME.

The CSG Subscription Data are a relevant list of a PLMN (VPLMN) CSG ID of a roaming destination and an equivalent PLMN of the roaming destination. The CSG Subscription Data may be associated with an expiration date indicating an expiration date of the CSG ID and an absent expiration date indicating that there is no expiration date for each CSG ID. The CSG ID may be used for a specific PDN connection through LIPA.

The LIPA Allowed indicates whether the UE is allowed to use LIPA in this PLMN.

The Subscribed Periodic RAU/TAU Timer is a timer of a periodic RAU and/or TAU.

The MPS CS priority indicates that the UE is registered in eMLPP or a 1×RTT priority service in the CS domain.

The MPS EPS priority is identification information indicating that the UE is registered in MPS in the EPS domain.

The Voice Support Match Indicator indicates whether a radio capability of the UE is compatible with the network configuration. For example, the Voice Support Match Indicator indicates whether the SRVCC support by the UE matches the support for voice call by the network.

The Homogenous Support of IMS Voice over PS Sessions for MME is instruction information indicating, for each UE, whether an IMS voice call on a PS session is supported. The Homogenous Support of IMS Voice over PS Sessions for MME includes "Supported" in which an IP Multimedia Subsystem (IMS) voice call on a Packet Switched (PS: line switching) session in all the Tracking Areas (TAs) managed by the MME is supported, and "Not Supported" indicating a case where there is no TA in which the IMS voice call on the PS session is supported. Additionally, the MME does not notify the HSS of this instruction information, in a case that the IMS voice call on the PS session is not uniformly supported (the TA in which the support is performed and the TA in which the support is not performed are both present in the MME), and in a case that it is not clear whether it is supported.

Additionally, the MME context for each PDN connection includes an APN in Use, an APN Restriction, an APN Subscribed, a PDN Type, an IP Address, EPS PDN Charging Characteristics, an APN-OI Replacement, SIPTO permissions, a Local Home Network ID, LIPA permissions, a WLAN offloadability, a VPLMN Address Allowed, a PDN GW Address in Use (control information), a PDN GW TEID for S5/S8 (control information), an MS Info Change Reporting Action, a CSG Information Reporting Action, a Presence Reporting Area Action, an EPS subscribed QoS profile, a Subscribed APN-AMBR, an APN-AMBR, a PDN GW GRE Key for uplink traffic (user data), and a Default bearer.

The APN in Use indicates APN which is recently used. This APN includes identification information about the APN network and identification information about a default operator.

The APN Restriction indicates a restriction on a combination of an APN type to APN associated with this bearer context. In other words, the APN Restriction is information for restricting the number of APNs and the type of APNs which can be established.

The APN Subscribed refers to a registration APN received from the HSS.

The PDN Type indicates the type of the IP address. The PDN Type indicates IPv4, IPv6, or IPv4v6, for example.

The IP Address indicates an IPv4 address or an IPv6 Prefix. Note that the IP address may store both the IPv4 and IPv6 prefixes.

The EPS PDN Charging Characteristics indicate a charging performance. The EPS PDN Charging Characteristics may indicate, for example, normal, prepaid, a flat rate, or hot billing.

The APN-OI Replacement is a proxy domain name of APN having the same role as that of the APN-OI Replacement, registered for each UE. Note that the APN-OI Replacement has a higher priority than that of the APN-OI Replacement for each UE.

The SIPTO permissions indicate permission information to a Selected IP Traffic Offload (SIPTO) of traffic using this APN. Specifically, the SIPTO permissions identify a prohibition of the use of SIPTO, permission of the use of SIPTO in the network excluding the local network, permission of the use of SIPTO in the network including the local network, or permission of the use of SIPTO only in the local network.

The Local Home Network ID indicates identification information of a home network to which the base station belongs, in a case that SIPTO (SIPTO@LN) using the local network can be used.

The LIPA permissions are identification information indicating whether this PDN can access through LIPA. Specifically, the LIPA permissions may be an LIPA-prohibited which does not allow LIPA, an LIPA-only which allows only LIPA, or an LIPA-conditional which allows LIPA depending on a condition.

The WLAN offload ability is identification information indicating whether traffic connected through this APN can perform offload to the wireless LAN by utilizing a cooperative function between the wireless LAN and 3GPP, or maintains the 3GPP connection. The WLAN offload ability may vary for each RAT type. Specifically, different WLAN offload abilities may be present for LTE (E-UTRA) and 3G (UTRA).

The VPLMN Address Allowed indicates whether a connection in which the UE uses this APN is allowed to use only an HPLMN domain (IP address) PGW in PLMN (VPLMN) of the roaming destination or allowed to use additionally the PGW in the VPLMN domain.

The PDN GW Address in Use (control information) indicates a recent IP address of the PGW. This address is used when a control signal is transmitted.

The PDN GW TEID for S5/S8 (control information) is a TEID used for transmission and/or reception of the control information in an interface (S5/S8) between the SGW and the PGW.

The MS Info Change Reporting Action is an information element indicating that it is necessary to notify the PGW of user location information being changed.

The CSG Information Reporting Action is an information element indicating that it is necessary to notify the PGW of CSG information being changed.

The Presence Reporting Area Action indicates necessity of notification of the change as to whether the UE is present in a Presence Reporting Area. This information element separates into identification information of the presence reporting area and an element included in the presence reporting area.

The EPS subscribed QoS profile indicates a QoS parameter to a default bearer at a bearer level.

The Subscribed APN-AMBR indicates the maximum value of the Maximum Bit Rate (MBR) of the uplink communication and the downlink communication for sharing all the Non-GBR bearers (non-guaranteed bearers) established for this APN in accordance with the user subscriber information.

The APN-AMBR indicates the maximum value of the Maximum Bit Rate (MBR) of the uplink communication and the downlink communication for sharing all the Non-GBR bearers (non-guaranteed bearers) established for this APN, which has been determined by the PGW.

The PDN GW GRE Key for uplink traffic (user data) is a Generic Routing Encapsulation (GRE) key for the uplink communication of the user data of the interface between the SGW and the PGW.

The Default Bearer is, at the time of establishing the PDN connection, information that is acquired and/or generated, and EPS bearer identification information for identifying a default bearer associated with the PDN connection.

Additionally, the MME context stored for each bearer includes an EPS Bearer ID, a TI, an S-GW IP address for S1-u, an S-GW TEID for S1u, a PDN GW TEID for S5/S8, a PDN GW IP address for S5/S8, an EPS bearer QoS, and a TFT.

The EPS Bearer ID is the only identification information for identifying the EPS bearer for a UE connection via the E-UTRAN.

Note that the EPS Bearer ID may be the EPS bearer identification information identifying a dedicated bearer. Accordingly, the EPS Bearer ID may be identification information for identifying the EPS bearer that is different from the Default bearer.

Note that as describe above, the EPS bearer may be a communication path established between the UE_A 10 and the C-SGN_A 95. Furthermore, the EPS bearer may be configured of a Radio Bearer (RB) established between the UE_A 10 and the eNB_A 45 and an S1 bearer established between the eNB_A 45 and the C-SGN_A 95. Here, the RB and the EPS bearer may be in one-to-one correspondence. Accordingly, identification information of the RB may be in one-to-one correspondence to the EPS bearer identification information, or may be the same identification information.

Additionally, the EPS bearer may be a logical communication path established between the UE_A 10 and the PGW_A 30. In this case as well, the EPS bearer may be configured by including the Radio Bearer (RB) established between the UE_A 10 and the eNB_A 45. Furthermore, the RB and the EPS bearer may be in one-to-one correspondence. Accordingly, the identification information of the RB may be in one-to-one correspondence to the EPS bearer identification information, or may be the same identification information.

Accordingly, an EPS bearer ID identifying the dedicated bearer may be identification information identifying a Signalling Radio Bearer (SRB) and/or Control Signalling Radio Bearer (CRB), or may be identification information identifying a Data Radio Bearer (DRB).

Here, as described above, the SRB in the present embodiment may originally be the RB established for transmitting and/or receiving control information such as a control message or the like. Here, the CRB in the present embodiment may originally be the RB established for transmitting and/or receiving control information such as a control message or the like. Note that in the present embodiment, using the RB that is originally used for transmitting and/or receiving the control message, transmission and/or reception of user data is performed. Accordingly, in the present embodiment, using the SRB or the CRB, the control message and the user data are transmitted and/or received.

Additionally, the DRB in the present embodiment may be the RB established for transmission and/or reception of the user data.

The TI is an abbreviation of a "Transaction Identifier", and is identification information identifying a bidirectional message flow (Transaction).

The S-GW IP address for S1-u is an IP address of the SGW used for an interface between the eNB and the SGW.

Additionally, in a case that the user data are transmitted and/or received by being included in a message for the control information, the S-GW IP address for S1-u may be an IP address of the SGW used for the MME and/or an interface between the SGSN and the SGW, or may be the S-GW IP address for S11/S4.

The S-GW TEID for S1u is a TEID of the SGW used for the interface between the eNB and the SGW.

Additionally, in a case that the MME and/or the user data are transmitted and/or received by being included in the message for the control information, the S-GW TEID for S1u may be an TEID address of the SGW used for the interface between the SGSN and the SGW, or may be the S-GW TEID for S11/S4.

The PDN GW TEID for S5/S8 is a TEID of the PGW for user data transmission in the interface between the SGW and the PGW.

The PDN GW IP address for S5/S8 is an IP address of the PGW for user data transmission in the interface between the SGW and the PGW.

The EPS bearer QoS includes a QoS Class Identifier (QCI) and an Allocation and Retention Priority (ARP). QCI indicates a class to which the QoS belongs. QoS can be classified in accordance with presence or absence of band control, an allowable delay time, a packet loss rate, or the like. The QCI includes information indicating the priority. ARP is information representing a priority relating to maintaining the bearer.

The TFT is an abbreviation of a "Traffic Flow Template", and indicates all packet filters associated with the EPS bearer.

Figures 6A, 6B, 6C, 6D:
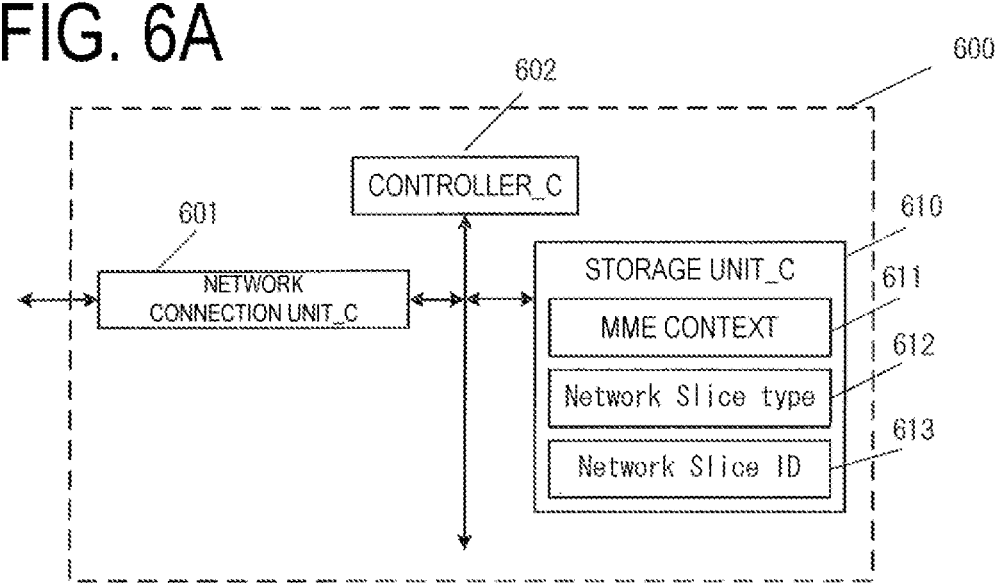
FIGS. 6A to 6D are diagrams illustrating a device configuration of an MME.

Additionally, FIG. 6C illustrates the Network Slice type 612 included in the storage unit_C 610, and FIG. 6D illustrates the Network Slice ID 613.

As illustrated in the drawing, the Network Slice type 612 is configured of the Network Slice type and the Isolation level. The Network Slice type 612 may hold multiple Network Slice types and Isolation levels. Additionally, the Network Slice type and the Isolation level may be stored while being associated with each other.

In the same manner, the Network Slice ID 613 is configured of the Network Slice ID and the Isolation level. The Network Slice ID 612 may hold multiple Network Slice IDs and Isolation levels. Additionally, the Network Slice ID and the Isolation level may be stored while being associated with each other.

As illustrated in the diagram, it can be seen that, for the Network Slice type of the MME_D 105, a type 1 and a type 2 are supported, and the isolation level of each type is a level 2. In the same manner, it can be seen that the MME_D 105 is included in a Network Slice ID 1 and a Network Slice ID 2, and the isolation level of each ID is the level 2.

Note that although FIGS. 6A to 6D mainly illustrate the configuration of the MME_D 105, for example, in a case of the MME_A 104, the type 1 may be stored for the Network Slice type and the isolation level of Lv. 2 may be stored in the storage unit_C 610.

Additionally, the Network Slice type 612 may be included in the MME context 611. Specifically, the type may be included in the MME for each PDN connection or the MME context for each bearer.

Alternatively, as illustrated in FIGS. 6A to 6D, the MME_D 105 may store the MME context 611 and the Network Slice type 612 so as to be independent of each other.

1.3. Processing Example

A processing example according to the present embodiment will be described below.

1.3.1. Network Slice Type Notification Procedure

The UE_A 10 can perform beforehand an establishment procedure of a Radio Resource Control (RRC) connection before performing a Non-Access Stratum (NAS) procedure with the network. A method in which the UE acquires the Network Slice type and/or information on the Network Slice in the establishment procedure of the RRC connection in order to perform selection of the Network slice being a connection destination that is established in an attach procedure will be described below.

Figure 7:
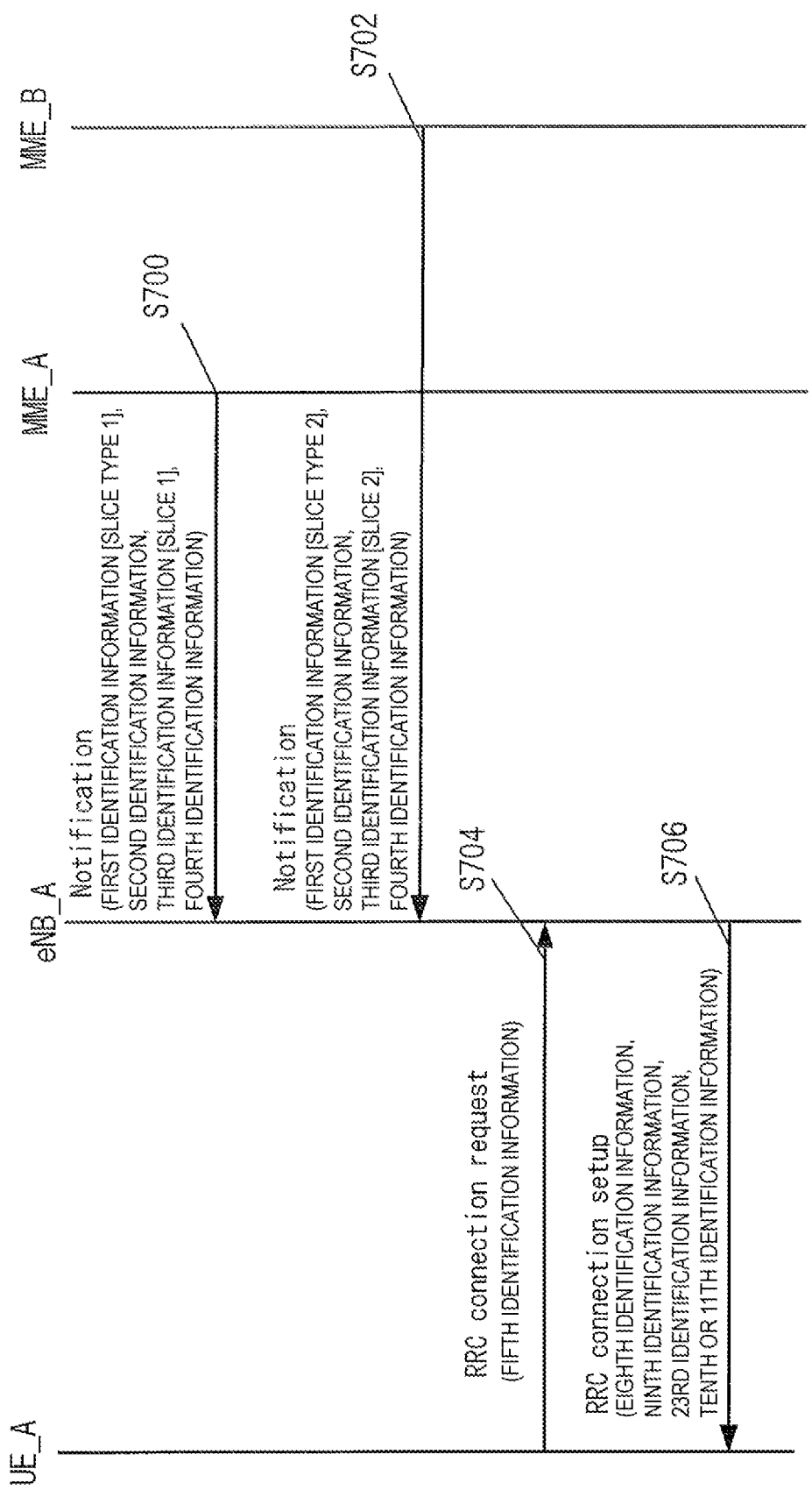
FIG. 7 is a diagram illustrating a notification procedure of a Network Slice type.

FIG. 7 illustrates an example of a notification procedure of the Network Slice type and/or the Network Slice ID. As illustrated in the drawing, each of the MME_A 104 and the MME_B 106 transmits a Notification message to the eNB_A 45 managed by each MME (S700, S702). The MME_A 104 and the MME_B 106 may transmit the Notification message based on completion of construction of the Network slice, or may periodically perform notification. Alternatively, with a configuration change of the Network slice, the Notification message may be transmitted.

The Notification message may be an MME Configuration Update message.

The Notification message includes first identification information and/or second identification information, and/or third identification information, and/or fourth identification information.

Here, the first identification information may be information for identifying the Network Slice type supported by the MME. Alternatively, the first identification information may be information for identifying the Network Slice type supported by the Network Slice in which the MME is included. In the following descriptions, the Network Slice Type supported by the MME may have the same meaning as the Network Slice type supported by the Network Slice in which the MME is included. Additionally, the first identification information may also be the UE usage type. Here, the information may be for identifying the Network Slice type or the UE usage type supported by the MME being a transmission source. In other words, the first identification information transmitted by the MME_A 104 and the first identification information transmitted by the MME_B 106 to the eNB_A 45 may be different from each other.

Additionally, the second identification information may be a degree of independence of the Network slice. In other words, the second identification information may be a degree of independence of an NF included in the Network Slice.

For example, the second identification information may be information indicating a degree of independence (Isolation level) of the MME being the NF with respect to other Network slices. In the present embodiment, since the MME may be included in one or multiple Network Slices, the number of the Network Slices in which the MME is included may be managed while being made to correspond to the degree of independence. Specifically, for example, in a case that the MME_A 104 belongs to the Network slice_A 101 and is independent of other Network slices, that is, in a case that the MME_A 104 is included only in one Network Slice, the isolation level may be made to be a level 2. On the other hand, in a case that the MME_A 104 belongs to the Network slice_A 101 and the Network slice_B 102 and the MME_A 104 is not independent in the Network slices, that is, in a case that the MME_A 104 is included in multiple Network Slices, the isolation level may be a level 1. In other words, the second identification information may be information indicating a degree of independence of the MME. Here, the information may be for indicating the Network Slice type identified by each MME being the transmission source using the first identification information or the Isolation level as the Network Slice indicated by the third identification information.

The third identification information may be information for identifying the Network Slice.

Additionally, the fourth identification information is information for identifying an MME included in the Network Slice that supports the Network Slice type that is the same as that of the MME. Specifically, in a case that the supported Network Slice types are the same for each group to which the MME belongs, the fourth identification information may be an MME Group ID (MMEGI) or an SGSN Group ID. Alternatively, in a case that, by using some of the GUMMEI as a wild card, the MME belonging to the same Network slice can be identified, the fourth identification information may be wild card information of the MME. Here, the information may be used for identifying the MME supporting the Network Slice type or the UE usage type identified by the first identification information.

Each of the MME_A 104 and the MME_B 106 may transmit the Notification message to the eNB_45 for each Network slice in which each MME is included, may transmit the Notification message for each Network Slice type or UE usage type, or may include multiple pieces of the first to fourth identification information in one Notification.

In other words, in a case that the MME_A 104 supports each of the Network slice_A 101 and the Network slice_B 102, each piece of the identification information for the Network slice_A 101 and each piece of the identification information for the Network slice_B 102 may be transmitted to the eNB_45 while being included in different Notification messages, respectively, or may be transmitted to the eNB_45 while being included in the same Notification message.

Additionally, the MME_A 104 and the MME_B 106 may transmit the Notification message while including the UE Usage type supported by each MME therein. In other words, the MME_A 104 and the MME_B 106 may transmit the Notification message while including the UE usage type supported by the Network Slice in which each MME is included therein. Note that each MME may acquire the UE Usage type from the HSS beforehand.

An acquisition method of the UE usage type from the HSS by each MME may be, for example, a procedure in which the MME periodically transmits an inquiry message to the HSS, and receives a response message corresponding to the inquiry message from the HSS.

The eNB_A 45 may transmit a response message to each MME (MME_A 104, MME_B 106) for each received Notification message. The response message may be an MME configuration update Acknowledge.

Additionally, in a case that a Relative MME Capacity is included in the MME Configuration update message, at a time of MME reselection by the eNB_A 45, the first identification information and/or the second identification information may be used while being given priority over information indicated by the Relative MME Capacity.

Additionally, the Notification message may be a response based on a request from the eNB_A 45. Specifically, the eNB_A 45 may transmit a request message for requesting information on the MME to each MME, and as a response thereto, may receive the Notification message.

The request message may be an S1 Setup Request message or an eNB Configuration Update message, the eNB_A 45 may transmit the request message while including identification information of the eNB_A 45 therein.

Additionally, the Notification message transmitted from each MME as a response to the request message may be an S1 Setup Response message or an eNB Configuration Update Acknowledge.

On the other hand, the UE_A 10 transmits an RRC message to the eNB_A 45 (S704). The RRC message may be an RRC connection Request message for establishing the RRC connection between the UE_A 10 and the eNB_A 45. The UE_A 10 transmits the RRC message while including at least fifth identification information therein.

The fifth identification information may be information indicating that the UE_A 10 requests a connection to the Network slice, information indicating that the UE_A 10 has a function to select the Network Slice type and/or the Network Slice and/or the Isolation level, or information obtained by combining these pieces of information. The fifth identification information may be UE Capability information for indicating that the UE_A 10 has a function to connect to the Network slice.

The fifth identification information may be information for requesting an eighth identification information group and/or a ninth identification information group and/or a 23rd identification information group from the network. Furthermore, the fifth identification information may be information for requesting the third identification information from the network.

Here, the eighth identification information group may be an information list for identifying the Network Slice type supported by the Network Slice in which the MME to which the eNB_A 45 connects is included. In other words, as illustrated in the drawing, in a case that the eNB_A 45 connects to both the MME_A 104 included in the Network slice_A classified as the Network Slice type_A and the MME_B 106 included in the Network slice_B classified as the Network Slice type_B, the eighth identification information group may be configured for including the first identification information to identify the Network Slice type_A and the first identification information to identify the Network Slice type_B. The eighth identification information group may be configured of one or multiple pieces of the first identification information that the eNB_A 45 acquires from the MME_A 104 and the MME_B 106.

Additionally, the ninth identification information group may be an information list for identifying the Network Slice in which the MME to which the eNB_A 45 connects is included. In other words, as illustrated in the drawing, in a case that the eNB_A 45 connects to both the MME_A 104 included in the Network slice_A and the MME_B 106 included in the Network slice_B, the ninth identification information group may be configured by including the third identification information to identify the Network Slice_A and the third identification information to identify the Network Slice_B. The ninth identification information group may be configured of one or multiple pieces of the third identification information that the eNB_A 45 acquires from the MME_A 104 and the MME_B 106.

Additionally, the 23rd identification information group may be an information list for identifying a degree of independence of the Network Slice in which the MME to which the eNB_A 45 connects is included. In other words, the 23rd identification information may be a list of the degree of independence of the NF included in the Network Slice.

For example, as illustrated in the drawing, in a case that the eNB_A 45 connects to both the MME_A 104 included in the Network slice_A and the MME_B 106 included in the Network slice_B, the ninth identification information group may be updated by including a degree of independence with respect to the Network Slice_A and a degree of independence with respect to the Network Slice_B. The 23rd identification information group may be configured of one or multiple pieces of the second identification information that the eNB_A 45 acquires from the MME_A 104 and the MME_B 106.

The eNB_A 45 receives the RRC message and/or the fifth identification information from the UE_A 10.

The eNB_A 45 transmits, based on the fifth identification information being included in the RRC message received from the UE_A 10, the RRC message as a response, while including the eighth identification information group and/or the ninth identification information group and/or the 23rd identification information group therein, to the UE_A 10 (S706).

In a case that the RRC message that is received by the eNB_A 45 from the UE_A 10 is the RRC connection Request message, the RRC message as the response may be an RRC connection setup message.

Additionally, the eNB_A 45 may include tenth identification information or 11th identification information in the RRC message as the response.

The tenth identification information is information for identifying a connection mode to the Network Slice that is authenticated with respect to the UE, and may be identification information indicating that the mode in which the UE connects to only one Network Slice is allowed. In other words, here, the identification information may be for indicating that the eNB_A 45 allows the UE_A 10 to connect to only one Network Slice.

The 11th identification information is information for identifying a connection mode to the Network Slice that is authenticated with respect to the UE, and may be identification information indicating that the mode in which the UE connects to one or multiple Network Slices is allowed. In other words, here, the identification information may be for indicating that the eNB_A 45 allows the UE_A 10 to connect to multiple Network Slices.

The UE_A 10 receives, from the eNB_A 45, the response message, and/or the eighth identification information group, and/or the ninth identification information group and/or the 23rd identification information group.

Through the above-described procedures, the eNB_A 45 acquires the Network Slice type supported by the Network Slice in which each MME is included from each MME. Additionally, the eNB_A 45 can notify the UE_A 10, based on the notification from the UE_A 10 of supporting the connection to the Network slice and/or the UE_A 10 having a function to select the Network Slice type, of the Network Slice type supported by the eNB_A 45 and/or the Network Slice ID. Note that the Network Slice Type and/or the Network Slice ID of which the eNB_A 45 notifies the UE_A 10 may be an information group configured of the multiple Network Slice Types and/or Network Slice IDs.

1.3.2. Attach Procedure

Figure 8:
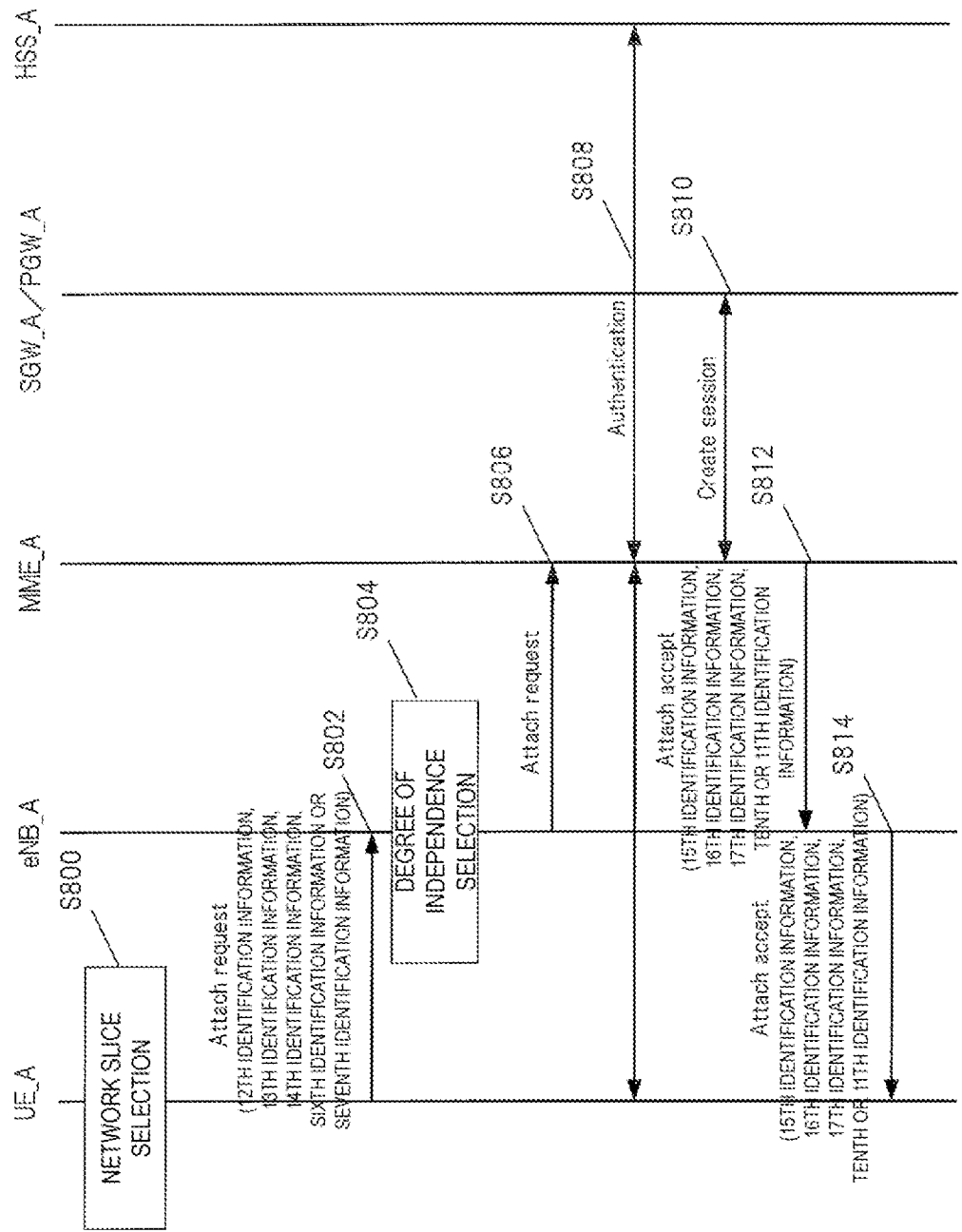
FIG. 8 is a diagram illustrating an attach procedure.

Next, an attach procedure will be described. FIG. 8 illustrates an example of the attach procedure according to the present embodiment.

The UE_A 10 selects the Network Slice type and/or the Network Slice based on the reception of the RRC message and/or the reception of the eighth identification information group and/or the ninth identification information group from the eNB_A 45 (S800). The UE_A 10 may select the Network Slice type and/or Network Slice to be requested based on the Network Slice type or the UE usage type that the UE stores.

The UE_A 10 may select the Network Slice type and/or the Network Slice, in a case that the eNB_A 45 does not support the Network Slice type and/or the Network Slice that the UE itself stores, among the Network Slice types notified by the eNB_A 45.

Note that the UE_A 10 may not select the Network Slice type and/or the Network Slice.

The UE_A 10 transmits an Attach Request message to the eNB_A 45 (S802). The UE_A 10 may include 12th identification information and/or 13th identification information and/or 14th identification information in the RRC message with the Attach Request message and transmit them.

The 12th identification information may be information for identifying the Network Slice type requested by the UE. In a case that the UE_A 10 selects the Network Slice type, the information may be for identifying the Network Slice type selected from among the multiple pieces of first identification information included in the eighth identification information group received by the UE_A 10 from the eNB_A 45. Alternatively, in a case that the UE_A 10 does not select the Network Slice type from the eighth identification information group notified from the network, the 12th identification information may be information for identifying the Network Slice type stored in the UE.

The 13th identification information may be information for identifying the Network Slice requested by the UE. In a case that the UE_A 10 selects the Network Slice, the information may be for identifying the Network Slice selected from the multiple pieces of third identification information included in the ninth identification information group received by the UE_A 10 from the eNB_A 45. Alternatively, in a case that the UE_A 10 does not select the Network Slice from the ninth identification information group notified from the network, the 13th identification information may be information for identifying the Network Slice stored in the UE.

The 14th identification information may be the degree of independence of the Network slice requested by the UE. In other words, the 14th identification information may be the degree of independence of the NF included in the Network Slice requested by the UE.

For example, the 14th identification information may be information indicating the degree of independence of the MME with respect to other Network slices. In the present embodiment, since the MME may be included in one or multiple Network Slices, the number of the Network Slices in which the MME is included may be managed while being made to correspond to the degree of independence. Specifically, for example, in a case that the MME_A 104 belongs to the Network slice_A and is independent of other Network slices, the isolation level may be made to be the level 2. On the other hand, in a case that the MME_A 104 belongs to the Network slice_A and the Network slice_B and the MME_A 104 is not independent of other Network slices (the Network slice_B in this case), the isolation level may be the level 1. In other words, the 14th identification information may be information indicating the degree of independence of the MME.

Additionally, the UE_A 10 may transmit the Attach Request message, while including at least the IMSI or the Globally Unique Temporary Identity (GUTI), the UE Network capability, and an EPS Session Management (ESM) Message Container therein.

The ESM Message Container is a message container for transmitting a Session Management Message together with a Mobility Management Message such as the Attach Request message or the like. Specifically, for example, the UE_A 10 may transmit the ESM Message Container while including a PDN connectivity Request message therein.

The UE_A 10 may include the 12th identification information and/or the 13th identification information and/or the 14th identification information, and/or further sixth identification information or seventh identification information in the Attach Request message and transmit them. Specifically, the PDN connectivity Request message may include the 12th identification information and/or the 13th identification information and/or the 14th identification information, and the sixth identification information or the seventh identification information.

The sixth identification information may be identification information indicating that the UE requests a mode to connect to only one Network Slice, and/or the UE can connect to only one Network Slice. The sixth identification information may be UE preference information. Note that the sixth identification information may be information indicating the mode that indicates to connect to only one network slice.

The seventh identification information may be identification information indicating that the UE requests a mode to connect to one or more Network Slices, and/or the UE can connect to one or more Network Slices. The seventh identification information may also be the UE preference information. Note that the seventh identification information may be information to identify a mode indicating that a connection can be made to one or multiple network slices.

The eNB_A 45 receives the RRC message and/or the Attach Request message transmitted by the UE_A 10.

The eNB_A 45 selects the Network Slice type and/or the Network Slice based on the reception of the Attach Request message, and/or the 12th identification information and/or the 13th identification information from the UE_A 10 (S804).

Specifically, for example, in a case that identification information for identifying the Network Slice type_A is received as the 12th identification information from the UE_A 10, the eNB_A 45 determines to select the MME from a list of the MMEs supporting the Network Slice type_A. The eNB_A 45 may select the MME based on the MMEGI linked with the Network Slice Type identified by the 12th identification information. Here, the MMEGI may be the fourth identification information.

Additionally, in a case that identification information for identifying the Network Slice_A is received as the 13th identification information from the UE_A 10, the eNB_A 45 determines to select the MME from a list of the MMEs included in the Network Slice_A.

Additionally, in a case that the UE_A 10 does not transmit the 12th identification information and/or the 13th identification information with the Attach Request message, or in a case that the MME that supports the Network Slice type identified by the 12th identification information and/or the MME included in the Network Slice identified by the 13th identification information transmitted by the UE_A 10 with the Attach Request message cannot be selected, the eNB_A 45 may select an MME included in a default Network slice.

Furthermore, the eNB_A 45 selects the isolation level based on the reception of the Attach Request message and/or the 14th identification information from the UE_A 10 (S804).

Specifically, for example, in a case that identification information indicating that the isolation level is the level 2 is received as the 14th identification information from the UE_A 10, the eNB_A 45 further selects the MME whose isolation level is at least the level 2 or more from a list of the MMEs selected by selection of the Network Slice type.

Note that, in the case that the MME supporting the Isolation level identified by the 14th identification information received from the UE_A 10 cannot be selected from the MME list, the eNB_A 45 may select an alternative MME such as selecting an MME supporting the highest degree of independence, or the like.

In a case that the UE_A 10 does not transmit the 14th identification information with the Attach Request message, the MME selection based on the Isolation level may not be performed.

Additionally, in addition to the MME selection based on the 12th identification information to 14th identification information, the eNB_A 45 may select the MME in accordance with a physical location or a load state to each MME resource, as in an existing method.

By the above-described procedures, the eNB_A 45 selects an MME to be a transfer destination of the Attach Request message. In other words, the eNB_A 45 selects a Network slice to which the UE_A 10 connects. Furthermore, the eNB_A 45 may select a degree of independence of the Network slice to which the UE_A 10 connects. Hereinafter, the MME selected by the eNB_A 45 is assumed to be the MME_A 104. In other words, it is assumed that the eNB_A 45 selects the Network slice_A as the Network slice, and the level 2 as the Isolation level.

Next, the eNB_A 45 transmits an Attach Request message to the MME_A 104 (S806). The eNB_A 45 may transfer the received Attach Request message to the MME_A 104.

The eNB_A 45 may transmit the 12th identification information and/or the 13th identification information and/or the 14th identification information acquired from the UE_A 10 with the Attach Request message while including the pieces of information in a control message.

The MME_A 104 receives from the eNB_A 45 the Attach Request message and/or the control message transmitted by the UE_A 10.

In a case that there is no UE context of the UE_A 10, the MME_A 104 performs an authentication procedure of the HSS_A 50 and the UE_A 10 (S808). The MME_A 104 generates the UE context of the UE_A 10 by the authentication procedure and stores it.

At this time, the MME_A 104 may acquire, from the HSS_A 50, the UE usage type and/or the Network Slice type and/or the identification information of the Network Slice of the UE_A 10.

Alternatively, the MME_A 104 may acquire, using a procedure that is different from the authentication procedure, from the HSS, the UE usage type and/or the Network Slice type and/or the Network Slice ID.

Additionally, in a case of receiving the sixth identification information or the seventh identification information from the eNB_A 45, the MME_A 104 may determine a mode of connection that is allowed to the UE_A 10 in the authentication procedure. Specifically, in a case that the MME_A 104 acquires the sixth identification information from the eNB_A 45, a mode in which only one PDN connection is allowed may be allocated to the UE_A 10 from the registration information and the Network Capability of the UE. Likewise, in a case that the MME_A 104 acquires the seventh identification information from the eNB_A 45, a mode in which multiple PDN connections via one or multiple Network Slices are allowed to be established may be allocated to the UE_A 10 from the registration information and the Network Capability of the UE.

The authentication procedure is completed, then the MME_A 104 selects the SGW and the PGW, and performs a Create Session procedure with the SGW and the PGW (S810).

Specifically, for example, the MME_A 104 transmits a first Create Session Request message to the SGW_A 35, and the SGW_A 35 transmits, based on the received first Create Session Request message, a second Create Session Request message to the PGW_A 30. Furthermore, the PGW_A 30 transmits a first Create Session Response message to the SGW_A 35, and the SGW_A 35 transmits a second Create Session Response message to the MME. Through the above-described procedures, a bearer is established between the MME_A 104 and the SGW_A 35 and the PGW_A 30.

Note that the MME_A 104 may select the SGW and/or the PGW, in a case of acquiring the 12th identification information and/or the 13th identification information and/or the 14th identification information from the eNB_A 45, based on the 12th identification information and/or the 13th identification information and/or the 14th identification information.

The MME_A 104 transmits an Attach Accept message to the eNB_A 45 in order to transmit it to the UE_A 10 based on completion of the Create Session procedure (S812).

The MME may include 15th identification information and/or 16th identification information and/or 17th identification information in the Attach Accept message and transmit them. In addition, the MME_A 104 may further transmit the 15th identification information and/or the 16th identification information and/or the 17th identification information separately from the Attach Accept message.

Here, the 15th identification information may be information to identify the Network Slice Type that the network allows the UE to connect to. Specifically, the information may be for identifying the Network Slice type supported by the MME selected by the eNB_A 45. Here, the identification information may be for identifying the Network Slice type through the connection established in this Attach procedure. In other words, the 15th identification information may be identification information to identify the Network Slice type that the connection thereto is authenticated by the network in the Attach procedure. The 15th identification information may be information indicating the Network Slice type that is identical to that of the 12th identification information.

The 16th identification information may be information to identify the Network Slice that the network allows the UE to connect to. Specifically, the information may be for identifying the Network Slice in which the MME selected by the eNB_A 45 is included. Here, the identification information may be for identifying the Network Slice through the connection established in this Attach procedure. In other words, the 16th identification information may be identification information to identify the Network Slice that the connection thereto is authenticated by the network in the Attach procedure. The 16th identification information may be information indicating the Network Slice that is identical to that of the 13th identification information.

Additionally, the 17th identification information may be the degree of independence (Isolation level) of the Network slice. In other words, the 17th identification information may be the degree of independence of the NF included in the Network Slice.

For example, the 17th identification information may be information indicating the degree of independence of the MME with respect to other Network slices. In the present embodiment, since the MME may be included in one or multiple Network Slices, the number of the Network Slices in which the MME is included may be managed while being made to correspond to the degree of independence. Specifically, for example, in the case that the MME_A 104 belongs to the Network slice_A 101 and is independent of other Network slices, the isolation level may be made to be the level 2. On the other hand, in the case that the MME_A 104 belongs to the Network slice_A 101 and the Network slice_B 102 and the MME_A 104 is not independent of other Network slices (the Network slice_B in this case), the isolation level may be the level 1. In other words, the 17th identification information may be information indicating the degree of independence of the MME.

Here, the information may be for indicating the degree of independence in the connection established in this Attach procedure with respect to the Network slice belonging to the Network Slice type other than the Network Slice type identified by the 15th identification information and/or the Network Slice other than the Network Slice identified by the 16th identification information. The degree of independence identified by the 17th identification information may be identical to the degree of independence identified by the 14th identification information. Additionally, the degree of independence identified by the 17th identification information may be the degree of independence that is higher than the degree of independence identified by the 14th identification information.

In addition, the MME_A 104 may further include the tenth identification information or the 11th identification information in the Attach Accept message.

The tenth identification information is information for identifying the connection mode to the Network Slice that is authenticated by the network with respect to the UE, and may be identification information indicating that the mode in which the UE connects to only one Network Slice is allowed. In other words, here, the identification information may be for indicating that the MME_A 104 allows the UE_A 10 to connect to only one Network Slice.

The 11th identification information is information for identifying the connection mode to the Network Slice that is authenticated by the network with respect to the UE, and may be identification information indicating that the mode in which the UE connects to one or multiple Network Slices is allowed. In other words, here, the identification information may be for indicating that the MME allows the UE_A 10 to connect to multiple Network Slices.

Note that the MME_A 104 may transmit the tenth identification information or the 11th identification information while including these pieces of information in the Attach Accept message based on the sixth identification information or the seventh identification information included in the Attach Request message received from the UE_A 10.

The MME_A 104 may transmit the 15th identification information and/or the 16th identification information and/or the 17th identification information, and/or the tenth identification information or the 11th identification information by a message independent of the Attach Accept message. Specifically, for example, the MME_A 104 may transmit an initial context Setup Request message in which the Attach Accept message is included while including the 15th identification information and/or the 16th identification information and/or the 17th identification information, and/or the tenth identification information or the 11th identification information therein, to the eNB_A 45.

Alternatively, the MME_A 104 may transmit the 15th identification information and/or the 16th identification information and/or the 17th identification information, and/or the tenth identification information or the 11th identification information while including these pieces of information in an Activate Default EPS bearer context Request message in the ESM message Container included in the Attach Accept message.

Note that the Attach Accept message may further include the APN, the GUTI, a PDN address (the IP address of the UE), the EPS bearer ID, and the ESM message Container.

The eNB_A 45 receives the Attach Accept message transmitted by the MME_A 104.

The eNB_A 45 transmits, based on the Attach Accept message from the MME_A 104, the Attach Accept message to the UE_10 (S814).

The eNB_A 45 may transmit the 15th identification information and/or the 16th identification information and/or the 17th identification information, and/or the tenth identification information or the 11th identification information by a message independent of the Attach Accept message. Specifically, for example, the RRC message transmitted with the Attach Accept message may be transmitted while including the 15th identification information and/or the 16th identification information and/or the 17th identification information, and/or the tenth identification information or the 11th identification information.

Alternatively, the eNB_A 45 may transmit the 15th identification information and/or the 16th identification information and/or the 17th identification information, and/or the tenth identification information or the 11th identification information while including these pieces of information in the Activate Default EPS bearer context Request message included in the Attach Accept message.

The UE_A 10 receives the Attach Accept message transmitted by the MME_A 104 via the eNB_A 45.

Based on the reception of the Attach Accept message, the UE_A 10 reconfigures the RRC connection between the eNB_A 45 and the UE_A 10, transmits an Attach complete message to the MME_A 104, and establishes the PDN connection. Specifically, the UE_A 10 transmits an RRC connection reconfiguration complete message to the eNB_A 45, the eNB_A 45 transmits an Initial Context Response message to the MME_A 104. Here, the Initial Context Response message may include the TEID of the eNB_A 45 or a downlink address of the eNB_A 45. Furthermore, the UE transmits the Attach complete to the MME via the eNB_A 45.

As described above, the UE_A 10 can establish the PDN connection via the Network slice_A. In other words, the UE_A 10 can connect to the Network Slice_A. Furthermore, the UE_A 10 may determine whether to further continue a supplemental PDN connectivity procedure based on the reception of the tenth identification information or the 11th identification information from the network. Specifically, in a case that the UE_A 10 acquires the tenth identification information, it may be determined not to transmit the PDN connectivity Request message for establishing the supplemental PDN Connection to the network, and in a case that the UE_A 10 acquires the 11th identification information, it may be determined that the UE_A 10 transmits the PDN connectivity Request message to the network.

1.3.3. TAU Procedure

Next, a tracking area update procedure (Tracking Area Update (TAU)) by the UE_A that establishes the PDN connection via the Network slice_A will be described.

1.3.3.1. First TAU Procedure

Figure 9:
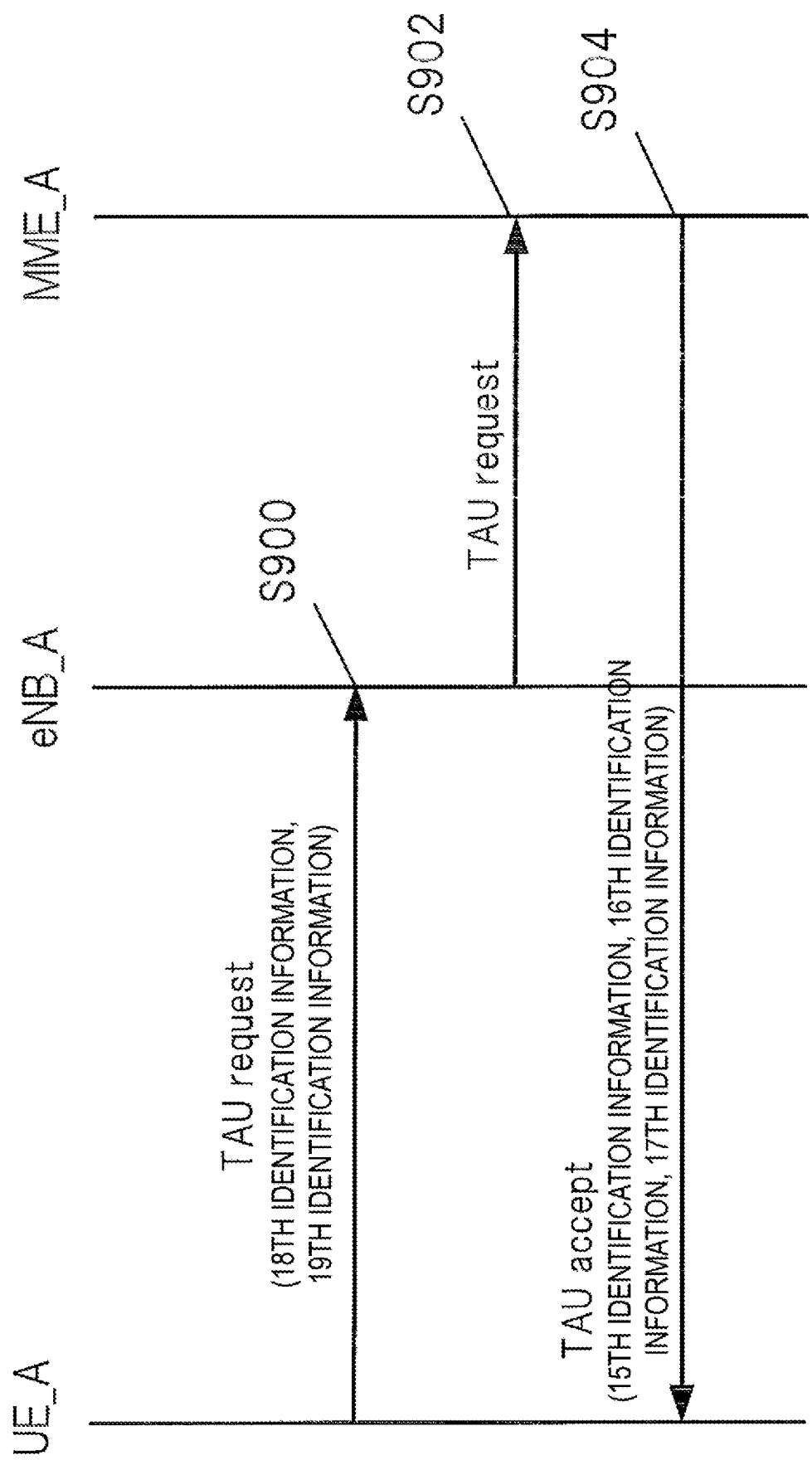
FIG. 9 is a diagram illustrating a first TAU procedure.

FIG. 9 illustrates a first TAU procedure. In the first TAU procedure, a case that the UE_A 10 can establish the PDN connection via the Network Slice with the Network Slice type as requested in the previous attach procedure or the TAU, and furthermore, a case that the requested Network Slice type and/or Isolation level are not changed at a timing of the TAU will be described.

The UE_A 10 transmits a TAU Request message to the eNB_A 45 (S900). The UE_A 10 may transmit 18th identification information and/or 19th identification information with the TAU Request message. Specifically, for example, the RRC message in which the TAU Request message is included may include the 18th identification information and/or the 19th identification information. Alternatively, an RRC parameter transmitted with the TAU Request message may be transmitted while the 18th identification information and/or the 19th identification information are included therein.

The 18th identification information may be information indicating that the UE_A 10 requests a connection to the Network slice, information indicating that the UE_A 10 has a function to select the Network Slice type and/or the Network Slice, or information obtained by combining these pieces of information. The 18th identification information may be the UE Capability information. A function of the UE indicated by the 18th identification information may be identical to the function of the UE indicated by the fifth identification information.

Here, the 19th identification information may be information indicating that the UE_A 10 does not request changing the Network Slice type and/or the Isolation level. Alternatively, the 19th identification information may be information indicating whether the UE_A 10 requests changing the Network Slice type and/or the Isolation level. In other words, the 19th identification information may be information indicating that the UE_A 10 requests changing the Network Slice type and/or the Isolation level, or may be information indicating that there is no request for the change. In this case, in the following descriptions, the 19th identification information may indicate that the UE_A 10 does not request changing the Network Slice type and/or the Isolation level.

Alternatively, the 19th identification information may be the GUMMEI. On the basis of the 19th identification information being identical to GUMMEI to identify the MME that performs mobility management of the UE_A 10, the eNB_A 45 may detect that the change in the Network Slice type is not requested.

Additionally, the TAU Request message includes at least an old GUTI. The old GUTI is information for identifying the MME to which the UE_A 10 connects at the most recent Attach procedure.

The UE_A 10 may further include the sixth identification information or the seventh identification information in the TAU Request message.

The sixth identification information may be identification information indicating that the UE requests a mode to connect to only one Network Slice, and/or the UE can connect to only one Network Slice. The sixth identification information may be the UE preference information. Additionally, the sixth identification information may be information identifying the mode to connect to only one Network Slice.

Additionally, the seventh identification information may be identification information indicating that the UE requests a mode to connect to one or multiple Network Slices, and/or the UE can connect to one or multiple Network Slices. The seventh identification information may also be the UE preference information. Additionally, the seventh identification information may be information identifying the mode in which the UE connects to one or multiple Network Slices.

The eNB_A 45 receives the TAU Request message transmitted by the UE_A 10.

On the basis of the reception of the TAU Request message and the 19th identification information from the UE_A 10, the eNB_A 45 may not perform reselection of a new MME, and may transfer the TAU Request message to the MME_A 104 (S902).

Additionally, in a case that the eNB_A 45 cannot use the MME_A 104, based on the 18th identification information and/or the 19th identification information, the eNB_A 45 may perform reselection of the MME and transmit the TAU Request message to the selected MME.

The eNB_A 45 may transmit an UPLINK NAS TRANSPORT with the TAU Request message. Alternatively, the TAU Request message may be included in the UPLINK NAS TRANSPORT. The UPLINK NAS TRANSPORT includes at least the MME UE S1AP ID, the eNB UE S1AP ID, the TAU Request message, an E-UTRAN CGI, and the TAI.

Here, the MME UE S1AP ID is information for identifying a connection to the UE in the MME.

Additionally, the eNB UE SLAP ID is information for identifying a connection to the UE in the eNB. The E-UTRAN CGI is information for identifying a cell.

The TAI is information for identifying the tracking area.

The MME_A 104 receives the TAU Request message transmitted by the UE_A 10 via the eNB_A 45.

The MME_A 104 updates the TAI of last TAU in the storage unit based on the reception of the TAU Request message. It is discussed whether reselection of the SGW is required. In a case of changing the SGW, a Create Session Request message may be transmitted to a new SGW. Furthermore, the selected new SGW may transmit a Modify beare Request message to the PGW_A 30 indicated by the Create Session Request message. The PGW_A 30 transmits a Modify Bearer Response message to the new SGW, and furthermore the new SGW may transmit a Create Session Response message to the MME_A 104.

Additionally, in a case that the MME_A 104 determines not to perform the reselection of the SGW, or based on establishment of a connection between the MME_A 104 and the SGW/PGW, the MME_A 104 may transmit a TAU Accept message to the UE via the eNB_A 45 (S904).

The MME_A 104 may transmit the TAU Accept message while including the 15th identification information and/or the 16th identification information and/or the 17th identification information therein.

Here, the 15th identification information may be information to identify the Network Slice Type that the network allows the UE to connect to. Specifically, the information may be for identifying the Network Slice type supported by the MME selected by the eNB_A 45. Here, the identification information may be for identifying the Network Slice type through the connection established in the TAU procedure. In other words, the 15th identification information may be identification information to identify the Network Slice type that the connection thereto is authenticated by the network in the TAU procedure.

The 16th identification information may be information to identify the Network Slice that the network allows the UE to connect to. Specifically, the information may be for identifying the Network Slice in which the MME selected by the eNB_A 45 is included. Here, the identification information may be for identifying the Network Slice through the connection established in the TAU procedure. In other words, the 16th identification information may be identification information to identify the Network Slice that the connection thereto is authenticated by the network in the TAU procedure.

Additionally, the 17th identification information may be the degree of independence of the Network slice. In other words, the 17th identification information may be the degree of independence of the NF included in the Network Slice.

For example, the 17th identification information may be information indicating the degree of independence of the MME with respect to other Network slices. In the present embodiment, since the MME may be included in one or multiple Network Slices, the number of the Network Slices in which the MME is included may be managed while being made to correspond to the degree of independence. Specifically, for example, in the case that the MME_A 104 belongs to the Network slice_A 101 and is independent of other Network slices, the isolation level may be made to be the level 2. On the other hand, in the case that the MME_A 104 belongs to the Network slice_A 101 and the Network slice_B 102 and the MME_A 104 is not independent of other Network slices (the Network slice_B in this case), the isolation level may be the level 1. In other words, the 17th identification information may be information indicating the degree of independence of the MME.

Here, the information may be for indicating the degree of independence in the connection established in the TAU procedure with respect to the Network slice with the Network Slice type other than the Network Slice type identified by the 15th identification information and/or the Network Slice identified by the 16th identification information.

Alternatively, the MME_A 104 may independently transmit the TAU Accept message, and the 15th identification information and/or the 16th identification information and/or the 17th identification information.

Specifically, the MME_A 104 may transmit the 15th identification information and/or the 16th identification information and/or the 17th identification information with the TAU Accept message to the eNB_A 45. The eNB_A 45 transmits, based on the reception of the TAU Accept message, the 15th identification information and/or the 16th identification information and/or the 17th identification information with the TAU Accept message, to the UE_A 10. In other words, the eNB_A 45 may transmit the RRC message, while including the TAU Accept message, and the 15th identification information and/or the 16th identification information and/or the 17th identification information therein, to the UE_A 10.

Additionally, in a case that the MME_A 104 is the new MME changed through the TAU procedure, the MME_A 104 may transmit the TAU Accept message while including the GUTI therein.

The UE_A 10 transmits, in a case that the new the GUTI is included in the TAU Accept message, a TAU Complete message to the MME_A 104.

As described above, the UE_A 10 can perform the TAU procedure in which the Network Slice type and the Isolation level are not changed.

1.3.3.2. Second TAU Procedure

Figure 10:
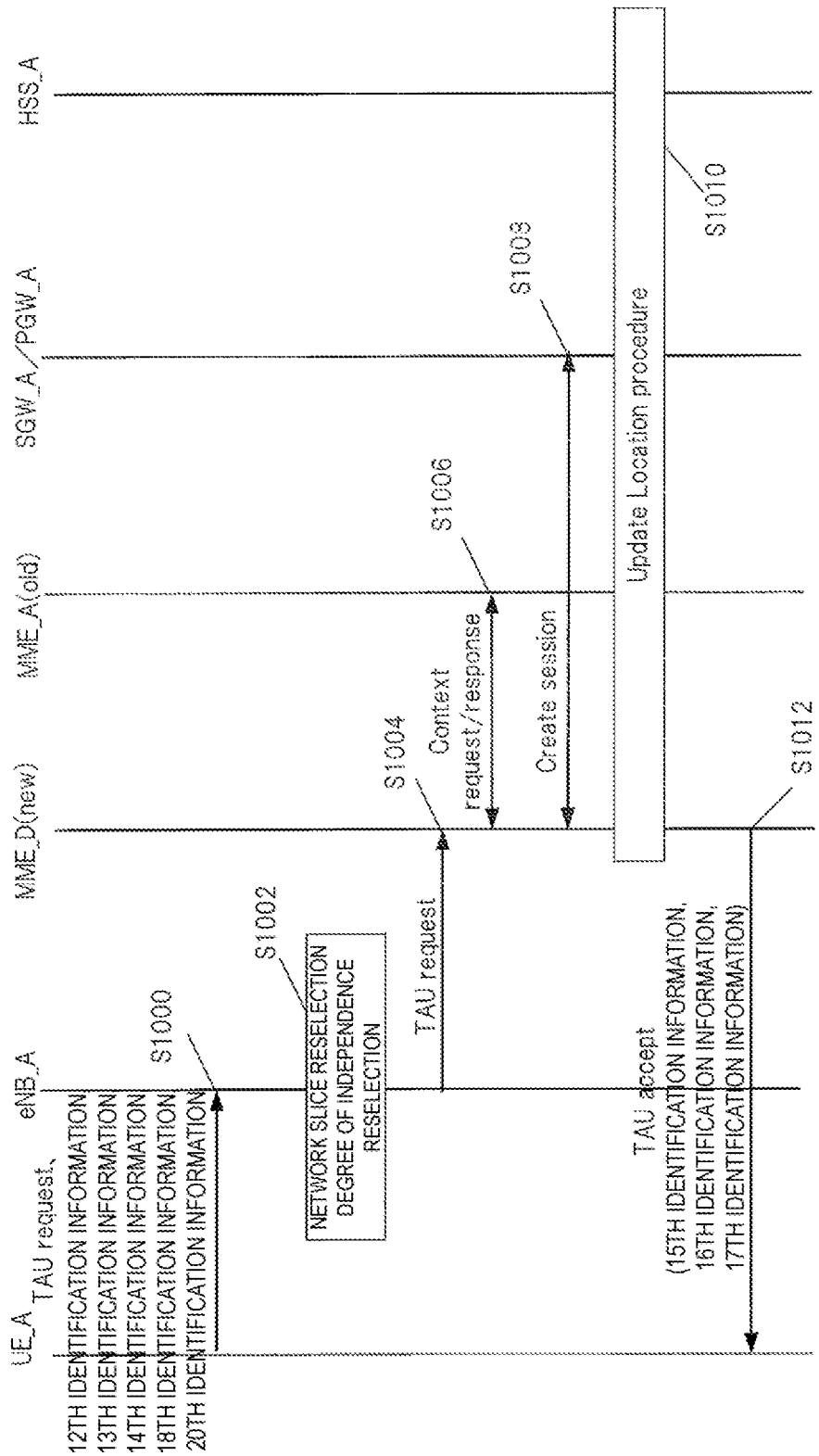
FIG. 10 is a diagram illustrating a second TAU procedure.

Next, a second TAU procedure will be described. FIG. 10 illustrates a second TAU procedure. In the second TAU procedure, a case that the UE_A cannot establish the PDN connection via the Network Slice with the Network Slice type as requested by the UE in the previous attach procedure, and/or a case that the connection is not the connection with the Isolation level as requested by the UE, or a case that the Network Slice type and/or the Isolation level requested by the UE changes from the previous TAU procedure or attach procedure will be described.

The UE_A 10 transmits the TAU Request message to the eNB_A 45 (S1000). The TAU Request message includes at least the old GUTI.

The UE_A 10 may transmit the 12th identification information and/or the 13th identification information and/or the 14th identification information and/or the 18th identification information and/or 20th identification information with the TAU Request message. Specifically, for example, the UE_A 10 may include the 12th identification information and/or the 13th identification information and/or the 14th identification information and/or the 18th identification information and/or the 20th identification information in the RRC message transmitted while including the TAU Request message. Alternatively, the UE may include the 12th identification information and/or the 13th identification information and/or the 14th identification information and/or the 18th identification information and/or 20th identification information in the RRC parameter transmitted with the TAU Request message and transmit them.

Furthermore, the UE_A 10 may include the sixth identification information or the seventh identification information in the RRC message.

The 12th identification information may be information for identifying the Network Slice type requested by the UE. In the case that the UE_A 10 selects the Network Slice type, the information may be for identifying the Network Slice type selected from among the multiple pieces of first identification information included in the eighth identification information group received by the UE_A 10 from the eNB_A 45. Alternatively, in the case that the UE_A 10 does not select the Network Slice type from the eighth identification information group notified from the network, the 12th identification information may be information for identifying the Network Slice type stored in the UE.

The 13th identification information may be information for identifying the Network Slice requested by the UE. In a case that the UE_A 10 selects the Network Slice, the information may be for identifying the Network Slice selected from the multiple pieces of third identification information included in the ninth identification information group received by the UE_A 10 from the eNB_A 45. Alternatively, in a case that the UE_A 10 does not select the Network Slice from the ninth identification information group notified from the network, the 13th identification information may be information for identifying the Network Slice stored in the UE.

The 14th identification information may be the degree of independence of the Network slice requested by the UE. In other words, the 14th identification information may be the degree of independence of the NF included in the Network Slice requested by the UE.

For example, the 14th identification information may be information indicating the degree of independence of the MME with respect to other Network slices. In the present embodiment, since the MME may be included in one or multiple Network Slices, the number of the Network Slices in which the MME is included may be managed while being made to correspond to the degree of independence. Specifically, for example, in a case that the MME_A 104 belongs to the Network slice_A and is independent of other Network slices, the isolation level may be made to be the level 2. On the other hand, in a case that the MME_A 104 belongs to the Network slice_A and the Network slice_B and the MME_A 104 is not independent of other Network slices (the Network slice_B in this case), the isolation level may be the level 1. In other words, the 14th identification information may be information indicating the degree of independence of the MME.

The sixth identification information may be identification information indicating that the UE requests a mode to connect to only one Network Slice, and/or the UE can connect to only one Network Slice. The sixth identification information may be the UE preference information. Additionally, the sixth identification information may be information identifying the mode in which the UE connects to only one Network Slice.

Additionally, the seventh identification information may be identification information indicating that the UE requests a mode to connect to one or multiple Network Slices, and/or the UE can connect to one or multiple Network Slices. The seventh identification information may also be the UE preference information. Additionally, the seventh identification information may also be information identifying the mode in which the UE connects to one or multiple Network Slices.

The 18th identification information may be information indicating that the UE_A 10 requests a connection to the Network slice, information indicating that the UE_A 10 has a function to select the Network Slice type and/or the Network Slice, or information obtained by combining these pieces of information. The 18th identification information may be the UE Capability information. A function of the UE indicated by the 18th identification information may be identical to the function of the UE indicated by the fifth identification information.

Here, the 20th identification information may be information indicating that the UE_A 10 requests changing the Network Slice type and/or the Isolation level. Alternatively, the 20th identification information may be information indicating whether the UE_A 10 requests changing the Network Slice type and/or the Isolation level. In other words, the 20th identification information may be information indicating that the UE_A 10 requests changing the Network Slice type and/or the Isolation level, or may be information indicating that there is no request for the change. In this case, in the following descriptions, the 20th identification information may indicate that the UE_A 10 requests changing the Network Slice type and/or the Isolation level.

Alternatively, the 20th identification information may be the GUMMEI. On the basis of the 20th identification information being empty, the eNB_A 45 may detect that the change of the Network Slice type is requested.

Additionally, the UE_A 10 may further include the 12th identification information and/or the 13th identification information and/or the 14th identification information and/or the 18th identification information and the 20th identification information in the TAU Request message and transmit them.

The eNB_A 45 initiates reselection of the Network Slice Type and/or the Network Slice based on the reception of the TAU Request message and/or the RRC message from the UE_A 10 (S1002). Specifically, the eNB_A 45 may start the reselection of the Network Slice Type and/or the Network Slice based on the reception of the 12th identification information and/or the 13th identification information.

The eNB_A 45 reselects the MME with the reselection of the Network Slice type and the Network Slice. The MME may be selected based on the 14th identification information in the reselection.

A specific MME selection method by the eNB_A 45 is the same as Attach procedure, and thus detailed descriptions thereof will be omitted.

In the following descriptions, a case that the MME_D 105 is reselected as a new MME will be described as an example.

The eNB_A 45 transfers the TAU Request message to the MME_D 105. The eNB_A 45 may transmit the Uplink NAS Transport with the TAU Request message. Alternatively, the TAU Request message may be included in the Uplink NAS Transport. The Uplink NAS Transport includes at least the MME UE S1AP ID, the eNB UE S1AP ID, the TAU Request message, the E-UTRAN CGI, and the TAI.

Here, the MME UE S1AP ID is information for identifying a connection to the UE in the MME.

Additionally, the eNB UE S1AP ID is information for identifying a connection to the UE in the eNB. The E-UTRAN CGI is information for identifying a cell.

The TAI is information for identifying the tracking area.

The MME_D 105 receives the TAU Request message transmitted by the UE_A 10 via the eNB_A 45.

Based on the GUTI included in the TAU Request message, the MME_D 105 transmits a Context Request message to the MME_A 104, and receives a Context Response message (S1006).

Based on this, the Context Response message includes at least the MM context of the UE_A 10, and through the above-described procedure, the MME_D 105 can obtain the MME context from the MME_A 104.

The MME_D 105 discusses whether reselection of the SGW is required based on the acquisition of the MME context. In a case of changing the SGW, the Create Session Request message may be transmitted to a new SGW (S1008). Furthermore, the selected new SGW may transmit the Modify beare Request message to the PGW_A 30 indicated by the Create Session Request message. The PGW_A 30 transmits the Modify Bearer Response message to the new SGW, and furthermore the new SGW may transmit the Create Session Response message to the MME_D 105.

Additionally, these procedures between the MME_D 105 and the SGW/PGW may be the Create Session procedure.

The MME_D 105 completes establishment of a connection between the MME_D 105 and the SGW/PGW with completion of the Create Session procedure.

The MME_D 105 starts a Location update procedure with the completion of the Create Session procedure (S1010).

Specifically, the MME_D 105 transmits an Update Location message to the HSS_A 50. The Update Location may include at least the IMSI and the PLMN of the UE_A 10. With this, the HSS_A 50 detects that the mobility management device of the UE_A 10 is changed from the MME_A 104 to the MME_D 105.

The HSS_A 50 transmits a Cancel Location message requesting deletion of the MM context to the MME_A 104. The Cancel Location message includes at least the IMSI.

Furthermore, the HSS_A 50 transmits an Update Location Ack to the MME_D 105. On the basis of reception of the Update Location Ack, the MME_D 105 is authenticated by the HSS_A 50 as the mobility management device of a new UE_A 10.

Through the above-described procedure, the MME_D 105, the MME_A 104 and the HSS_A 50 may complete the Location update procedure.

Based on the completion of the Location update procedure or the determination that the SGW is not changed after S1006, the MME_D 105 may transmit the TAU Accept message to the UE_A 10 via the eNB_A 45 (S1012).

The MME_D 105 may include the 15th identification information and/or the 16th identification information and/or the 17th identification information in the TAU Accept message and transmit them.

Here, the 15th identification information may be information to identify the Network Slice Type that the network allows the UE to connect to. Specifically, the information may be for identifying the Network Slice type supported by the MME selected by the eNB_A 45. Here, the identification information may be for identifying the Network Slice type through the connection established in the TAU procedure. In other words, the 15th identification information may be identification information to identify the Network Slice type that the connection thereto is authenticated by the network in the TAU procedure.

The 16th identification information may be information to identify the Network Slice that the network allows the UE to connect to. Specifically, the information may be for identifying the Network Slice in which the MME selected by the eNB_A 45 is included. Here, the identification information may be for identifying the Network Slice through the connection established in this TAU procedure. In other words, the 16th identification information may be identification information to identify the Network Slice that the connection thereto is authenticated by the network in the TAU procedure.

Additionally, the 17th identification information may be the degree of independence of the Network slice. In other words, the 17th identification information may be the degree of independence of the NF included in the Network Slice.

For example, the 17th identification information may be information indicating the degree of independence of the MME with respect to other Network slices. In the present embodiment, since the MME may be included in one or multiple Network Slices, the number of the Network Slices in which the MME is included may be managed while being made to correspond to the degree of independence. Specifically, for example, in a case that the MME_D 105 belongs to the Network slice_A 101 and is independent of other Network slices, the isolation level may be made to be the level 2. On the other hand, in a case that the MME_D 105 belongs to the Network slice_A 101 and the Network slice_B 102 and the MME_D 105 is not independent of other Network slices (the Network slice_B in this case), the isolation level may be the level 1. In other words, the 17th identification information may be information indicating the degree of independence of the MME.

Here, the information may be for indicating the degree of independence in the connection established in the Attach procedure with respect to the Network slice with the Network Slice type other than the Network Slice type identified by the 15th identification information and/or the Network Slice identified by the 16th identification information.

In addition, the MME_D 105 may further include the tenth identification information or the 11th identification information in the TAU Accept message.

The tenth identification information is information for identifying the connection mode to the Network Slice that is authenticated by the network with respect to the UE, and may be identification information indicating that the mode in which the UE connects to only one Network Slice is allowed. In other words, here, the identification information may be for indicating that the MME_D 105 allows the UE_A 10 to connect to only one Network Slice.

The 11th identification information is information for identifying the connection mode to the Network Slice that is authenticated by the network with respect to the UE, and may be identification information indicating that the mode in which the UE connects to one or multiple Network Slices is allowed. In other words, here, the identification information may be for indicating that the MME allows the UE_A 10 to connect to multiple Network Slices.

Alternatively, the MME_D 105 may independently transmit the TAU Accept message, and the 15th identification information and/or the 16th identification information and/or the 17th identification information.

Specifically, the MME_D 105 may transmit the 15th identification information and/or the 16th identification information and/or the 17th identification information with the TAU Accept message to the eNB_A 45.

The eNB_A 45 receives the TAU Accept message transmitted by the MME_D 105.

The eNB_A 45 transmits, based on the reception of the TAU Accept message, the 15th identification information and/or the 16th identification information and/or the 17th identification information with the TAU Accept message, to the UE_A 10. In other words, the eNB_A 45 may include the TAU Accept message and the 15th identification information and/or the 16th identification information and/or the 17th identification information in the RRC message and transmit them to the UE_A 10.

Additionally, the MME_D 105 may allocate a new GUTI to the UE_A 10, and may transmit the TAU Accept message while including the new GUTI therein.

The UE_A 10 transmits, in a case that the new the GUTI is included in the TAU Accept message, the TAU Complete message to the MME_A 104.

As described above, the UE_A 10 can perform the TAU procedure with the change in the Network Slice type and/or the Isolation level.

1.3.3.3. TAU Trigger

Figure 11:
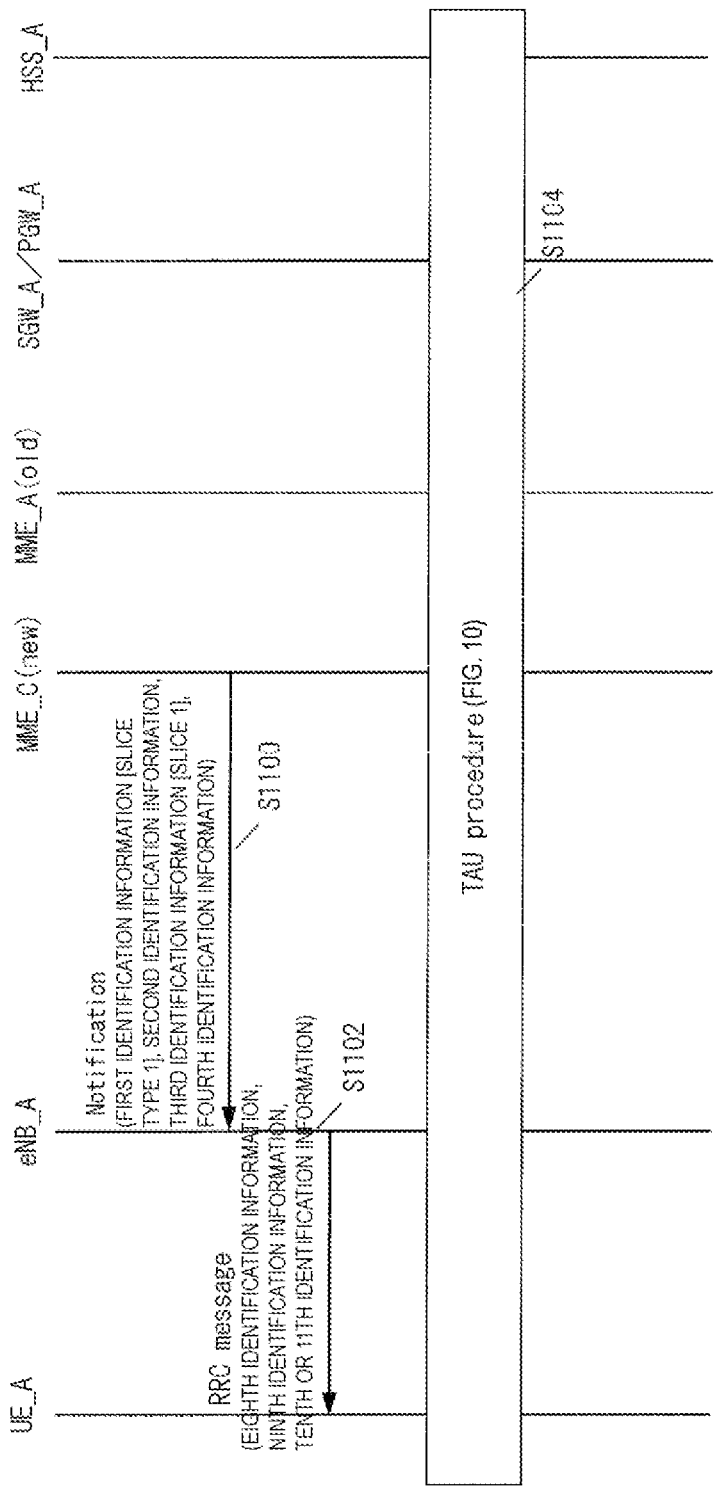
FIG. 11 is a diagram illustrating a TAU trigger.

Next, a TAU trigger will be described using FIG. 11.

Note that the UE_A 10 may initiate a periodical TAU procedure separately from a TAU procedure with a trigger, which will be described below, after the completion of the attach procedure.

Alternatively, as described below, the UE_A 10 may initiate the TAU procedure based on reception of notification from the eNB_A 45.

The MME_C 107 transmits, in a case that there is addition and change in the Network Slice type supported by the MME_C 107, a Notification message to the eNB_A 45 (S1100). The Notification message may be an MME Configuration Update message.

The Notification message includes at least the first identification information and/or the second identification information and/or the third identification information and/or the fourth identification information.

Here, the first identification information may be information for identifying the Network Slice type supported by the MME. Alternatively, the first identification information may be information for identifying the Network Slice type supported by the Network Slice in which the MME is included. Additionally, the first identification information may also be the UE usage type. Here, the information may be for identifying the Network Slice type or the UE usage type supported by the MME being a transmission source. In other words, the first identification information transmitted by the MME_A 104 and the first identification information transmitted by the MME_B 106 to the eNB_A 45 may be different from each other.

Additionally, the second identification information may be the degree of independence of the Network slice. For example, the information may be for indicating the degree of independence (Isolation level) of the MME with respect to other Network slices. Since the MME may be included in one or multiple Network Slices, the number of the Network Slices in which the MME is included may be managed while being made to correspond to the degree of independence. Specifically, for example, in the case that the MME_A 104 belongs to the Network slice_A 101 and is independent of other Network slices, that is, in the case that the MME_A 104 is included only in one Network Slice, the isolation level may be made to be the level 2. On the other hand, in the case that the MME_A 104 belongs to the Network slice_A 101 and the Network slice_B 102 and the MME_A 104 is not independent in the Network slices, that is, in the case that the MME_A 104 is included in multiple Network Slices, the isolation level may be the level 1. Here, the information may be for indicating the Isolation level as the Network Slice type identified by the MME being the transmission source using the first identification information.

The third identification information may be information for identifying the Network Slice.

Additionally, the fourth identification information is information for identifying an MME that supports the Network Slice type that is the same as that of the MME. Specifically, in a case that the supported Network Slice types are the same for each group to which the MME belongs, the fourth identification information may be the MME Group ID (MMEGI) or the SGSN Group ID. Alternatively, in a case that, by using some of the GUMMEI as a wild card, the MME belonging to the same Network slice can be identified, the fourth identification information may be wild card information of the MME. Here, the information may be used for identifying the MME supporting the Network Slice type or the UE usage type identified by the first identification information.

The MME_C 107 may transmit the Notification message to the eNB_45 for each Network slice and/or the Network Slice Type supported by the MME, or may include multiple pieces of the first to fourth identification information in one Notificaiton.

In other words, the MME_C 107 may transmit, in a case that each of the Network slice_A 101 and the Network slice_B 102 is supported, each piece of the identification information for the Network slice_A 101 and each piece of the identification information for the Network slice_B 102 to the eNB_45 while including the information in different Notification messages, respectively, or may transmit the information to the eNB_45 while including the information in the same Notification message.

Additionally, the MME_C 107 may include, in the Notification message, information for identifying to request update and/or addition and/or deletion of the Network Slice type supported by the MME_C 107 and/or the Network Slice in which the MME_C 107 is included.

In other words, the MME_C 107 may include, in the Notification message, information indicating that the Network Slice type and/or the Network Slice supported by the MME itself is added. Alternatively, the MME_C 107 may include, in the Notification message, information indicating that the Network Slice type and/or the Network Slice supported by the MME itself is deleted, that is, the support is stopped. Alternatively, the MME_C 107 may include, in the Notification message, information indicating that the Network Slice type and/or the Network Slice supported by the MME itself is updated.

In a case that the MME_C 107 includes, in the Notification message, information indicating that the Network Slice type and/or the Network Slice supported by the MME itself is added or deleted, one or multiple pieces of the first identification information and/or one or multiple pieces of the second identification information and/or one or multiple pieces of the third identification information and/or one or multiple pieces of the fourth identification information included in the Notification message may be information corresponding to the addition or deletion.

In other words, for example, in a case that the MME_C 107 notifies the eNB_A 45 of the addition of the Network Slice type_C, the MME_C 107 may transmit the Notification message to the eNB_A 45 while including the identification information for the notification of the addition of the supported Network Slice type, and the first identification information identifying the Network Slice type_C, and/or the second identification information indicating the degree of independence of the MME_C 107, and/or the third identification information therein.

Additionally, the MME_A 104 and the MME_B 106 may transmit the Notification message while including the UE Usage type supported by each MME therein. Note that each MME may acquire the UE Usage type from the HSS beforehand.

An acquisition method of the UE usage type from the HSS of each MME may be configured of, for example, a procedure in which the MME periodically transmits an inquiry message to the HSS, and receives a response message corresponding to the inquiry message from the HSS.

Additionally, the first identification information and/or the second identification information may be a part of the UE usage type.

In a case that the Notification message transmitted from the MME_C 107 to the eNB_A 45 is the MME Configuration update message, the eNB_A 45 may transmit, to the MME_C 107, an MME configuration update Acknowledge message for each received MME Configuration update message.

The eNB_A 45 receives the Notification message transmitted by the MME_C 107.

The eNB_A 45 may transmit the RRC message to the UE_A 10 with the reception of the Notification message from the MME_C 107, or with the update of the Network Slice type supported by the eNB_A 45 (S1102). Alternatively, based on the reception of the RRC message from the UE_A 10 and the update request of the Network Slice type and/or the Isolation level included in the RRC message, the eNB_A 45 may transmit the RRC message as the response to the UE_A 10.

The RRC message transmitted from the eNB_A 45 to the UE_A 10 includes at least the eighth identification information group and/or the ninth identification information group.

In a case that the RRC message that is received by the eNB_A 45 from the UE_A 10 is the RRC connection Request message, the RRC message as the response may be the RRC connection setup message.

Here, the eighth identification information group may be the information list for identifying the Network Slice type of the Network Slice in which the MME to which the eNB_A 45 connects is included. In other words, as illustrated in the drawing, in the case that the eNB_A 45 connects to both the MME_A 104 included in the Network slice_A classified as the Network Slice type_A and the MME_B 106 included in the Network slice_B classified as the Network Slice type_B, the eighth identification information group may be configured for including the first identification information to identify the Network Slice type_A and the first identification information to identify the Network Slice type_B. The eighth identification information group may be configured of one or more of the first identification information that the eNB_A 45 obtains from the MME_A 104 and the MME_B 106.

Additionally, the ninth identification information group may be the information list for identifying the Network Slice in which the MME to which the eNB_A 45 connects is included. In other words, as illustrated in the drawing, in a case that the eNB_A 45 connects to both the MME_A 104 included in the Network slice_A and the MME_B 106 included in the Network slice_B, the ninth identification information group may be configured by including the third identification information to identify the Network Slice_A and the third identification information to identify the Network Slice_B. The ninth identification information group may be configured of one or multiple pieces of the third identification information that the eNB_A 45 acquired from the MME_A 104 and the MME_B 106.

The UE_A 10 receives the RRC message transmitted by the eNB_A 45.

Through the above-described procedures, the UE_A 10 may acquire the Network Slice type supported by the eNB_A 45 and determine to start the TAU procedure (S1104).

Note that the TAU procedure may be a TAU procedure with the update of the Network Slice type and/or the Isolation level illustrated in FIG. 10.

1.3.4. PDN Connectivity Procedure

The establishment of the first PDN connection by the UE_A 10 is described in the chapter 1.3.1. In the following descriptions, a procedure for the UE_A 10 to further establish an additional PDN connection in order to simultaneously connect to multiple Network Slices after the attach procedure will be described.

Note that the procedure for establishing the supplemental PDN connection may also be performed only in a case that, in the initial attach procedure and/or in the RRC connection procedure, the UE is notified that multiple Network Slices can be connected from network.

Specifically, in a case that the UE_A 10 receives the Attach Accept message and/or the RRC message including the 11th identification information from the eNB_A 45, the UE_A 10 may start the establishment procedure of the supplemental PDN connection.

1.3.4.1. First PDN Connectivity Procedure

Figure 13:
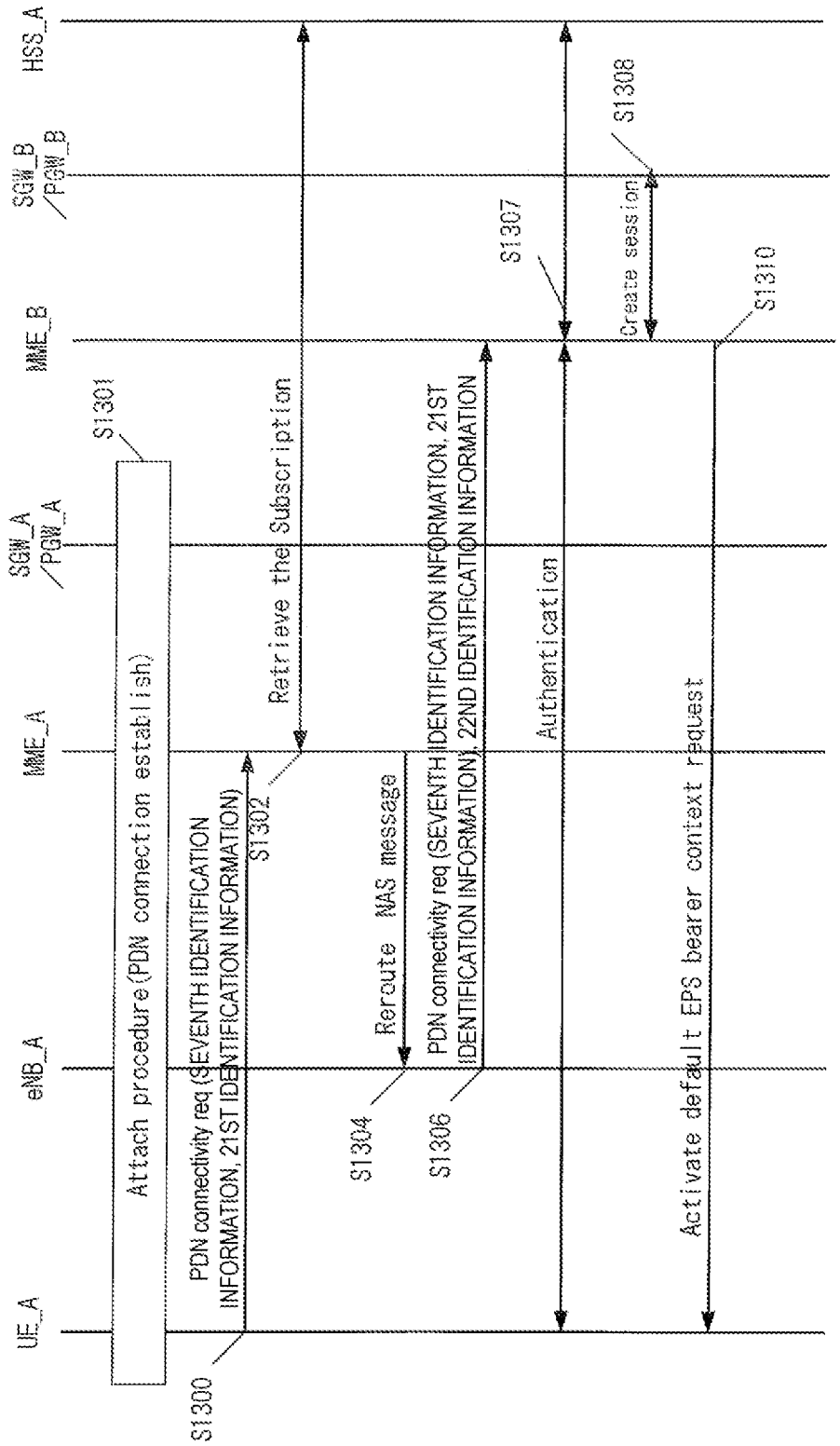
FIG. 13 is a diagram illustrating a first PDN connectivity procedure.

FIG. 13 illustrates a first PDN connectivity procedure example. First, an initial state before initiating the procedure (S1301) will be described. The UE_A 10 establishes a communication path, as the initial state, to the SGW_A 35 and the PGW_A 30 via the eNB_A 45. At this time, the MME_A 104 performs mobility management of the UE_A 10. That is, in other words, the state is a state that the UE_A 10 establishes a PDN connection via the Network Slice_A 101. Furthermore, the MME_A 104 is in a selected state in an initial Attach procedure by the UE_A 10. In other words, the state may be a state that an NAS signalling connection between the UE_A 10 and the MME_A 104 is established.

The UE_A 10 transmits the PDN connectivity Request message to the MME_A 104 in order to further establish the PDN Connection in the initial state in which the PDN Connection is established (S1300).

The PDN connectivity Request message may include the seventh identification information and/or 21st identification information and/or the 12th identification information and/or the 13th identification information and/or the 14th identification information.

Here, the seventh identification information may also be identification information indicating that the UE requests connections to multiple Network Slices. The seventh identification information may also be the UE preference information.

Additionally, the 21st identification information may be the application identification information. Furthermore, the information may be for identifying a service.

The 12th identification information may be information for identifying the Network Slice type requested by the UE. In the case that the UE_A 10 selects the Network Slice type, the information may be for identifying the Network Slice type selected from among the multiple pieces of first identification information included in the eighth identification information group received by the UE_A 10 from the eNB_A 45. Alternatively, in the case that the UE_A 10 does not select the Network Slice type from the eighth identification information group notified from the network, the 12th identification information may be information for identifying the Network Slice type stored in the UE.

The 13th identification information may be information for identifying the Network Slice requested by the UE. In a case that the UE_A 10 selects the Network Slice, the information may be for identifying the Network Slice selected from the multiple pieces of third identification information included in the ninth identification information group received by the UE_A 10 from the eNB_A 45. Alternatively, in a case that the UE_A 10 does not select the Network Slice from the ninth identification information group notified from the network, the 13th identification information may be information for identifying the Network Slice stored in the UE.

The 14th identification information may be the degree of independence of the Network slice requested by the UE. In other words, the 14th identification information may be the degree of independence of the NF included in the Network Slice requested by the UE.

For example, the 14th identification information may be information indicating the degree of independence of the MME with respect to other Network slices. In the present embodiment, since the MME may be included in one or multiple Network Slices, the number of the Network Slices in which the MME is included may be managed while being made to correspond to the degree of independence. Specifically, for example, in a case that the MME_A 104 belongs to the Network slice_A and is independent of other Network slices, the isolation level may be made to be the level 2. On the other hand, in a case that the MME_A 104 belongs to the Network slice_A and the Network slice_B and the MME_A 104 is not independent of other Network slices (the Network slice_B in this case), the isolation level may be the level 1. In other words, the 14th identification information may be information indicating the degree of independence of the MME.

The PDN connectivity Request message may include the APN. The APN may be information indicating a connection point and a connection function unit between the PDN and the Network Slice Instance.

The MME_A 104 receives the PDN connectivity request transmitted by the UE_A 10.

The MME_A 104 may perform, based on the seventh identification information and/or the 21st identification information included in the PDN connectivity Request message, an acquisition procedure of subscriber information of the UE_A 10 from the HSS_A 50 (S1302).

Specifically, for example, the MME_A 104 may request the acquisition of the subscriber information of the UE_A 10 by transmitting an Update Location Request message or an Authentication Information Request message to the HSS_A 50. Additionally, the HSS_A 50 may transmit to the UE_A 10, based on the request from the MME_A 104, an Update Location Acknowledge or an Authentication Information Answer while including the subscriber information requested by the UE_A 10 therein. In this case, the MME_A 104 may transmit the Update Location Request message or the Authentication Information Request message while including identification information or a Flag for identifying the request of the subscriber information of the UE_A 10 therein.

Furthermore, the MME_A 104 may include the 21st identification information in the Update Location Request message or the Authentication Information Request message.

The HSS_A 50 may include, in a case of receiving the 21st identification information from the MME_A 104, the subscriber information of the UE_A 10 based on an application or a service identified by the 21st identification information in the Update Location Acknowledge or the Authentication Information Answer.

Here, the subscriber information of the UE_A 10 requested by the UE_A 10 may be identification information of the UE usage type and/or the Network Slice type and/or the Network Slice of the UE_A 10. Additionally, the subscriber information of the UE_A 10 may include identification information of the MME corresponding to the identification information of the UE usage type and/or the Network Slice type and/or the Network Slice of the UE_A 10.

The MME_A 104 determines, based on the subscriber information of the UE_A 10 acquired from the HSS_A 50 or information stored in the storage unit of the MME_A 104, to request that the UE_A 10 performs rerouting of the NAS message received from the UE_A 10.

Here, rerouting of the NAS message refers to re-transferring the NAS message, which is once transferred to the MME by the UE, to another MME.

The MME_A 104 transmits a Reroute NAS message to the eNB_A 45 (S1304). The MME_A 104 transmits the Reroute NAS message while including information for identifying the MME being a rerouting destination therein. Specifically, for example, the MME_A 104 may transmit the fourth identification information while including it in the Reroute NAS message.

Additionally, the MME_A 104 may transmit the Reroute NAS message while including the reception NAS message therein. Specifically, the PDN connectivity Request message may be included in the Reroute NAS message. Additionally, the MME_A 104 may further include the identification information of the UE_A 10 in the Reroute NAS message.

The eNB_A 45 receives the Reroute NAS message transmitted by the MME_A 104.

The eNB_A 45 reselects the MME based on the acquisition of the Reroute NAS message from the MME_A 104. The eNB_A 45 may reselect the MME based on the information for identifying the MME being the rerouting destination acquired from the MME_A 104. Here, a case that the eNB_A 45 selects the MME_B 106 as a new MME will be described.

The eNB_A 45 retransmits the PDN connectivity Request message to the reselected MME_B 106 (S1306). The eNB_A 45 may include the identification information of the MME selected in the initial Attach procedure and a UE ID in the transmission message with the PDN connectivity Request message. Additionally, the eNB_A 45 may further include 22nd identification information in the transmission message.

Here, the 22nd identification information may be information indicating that the transmitted NAS message is transmitted from the UE that already establishes the NAS connection to another MME. Additionally, the 22nd identification information may be information for requesting the MME_B 106 to acquire context information of the UE_A 10 from the MME_A 104 or the HSS_A 50.

The MME_B 106 receives the PDN connectivity request that is transferred by the eNB_A 45.

The MME_B 106 may perform, based on the reception of the PDN connectivity Request message from the eNB_A 45, an authentication procedure between the HSS_A 50 and the UE_A 10 (S1307). An authentication procedure between the MME_A 104 and the HSS_A 50 and an authentication procedure between the MME_A 104 and the UE_A 10 may be the same as the procedure that is described in the attach procedure illustrated in FIG. 8.

Additionally, based on the reception of the 22nd identification information from the eNB_A 45, the MME_B 106 may request the UE context of the UE_A 10 to the MME_A 104 and acquire it before the authentication procedure.

The authentication procedure is completed, then the MME_B 106 selects the SGW and the PGW, and performs the Create Session procedure with the SGW and the PGW (S1308). The selection method of the SGW and the PGW and the Create Session procedure may be the same as the procedures illustrated in FIG. 8.

The MME_B 106 transmits, based on establishment of a communication path between the SGW and the PGW, the Activate default EPS bearer context Request message to the UE_A 10 (S1310). The MME_B 106 may include the 15th identification information and/or the 16th identification information and/or the 17th identification information in the Activate default EPS bearer context Request message.

Here, the 15th identification information may be information to identify the Network Slice Type that the network allows the UE to connect to. Specifically, the information may be for identifying the Network Slice type supported by the MME selected by the eNB_A 45. Here, the identification information may be for identifying the Network Slice type through the connection established in the establishment procedure of the supplemental PDN connection. In other words, the 15th identification information may be identification information to identify the Network Slice type that the UE_A 10 is authenticated to connect to by the network by the PDN connectivity Request message from the UE_A 10. The 15th identification information may be information indicating the Network Slice type that is identical to that of the 12th identification information.

The 16th identification information may be information to identify the Network Slice that the network allows the UE to connect to. Specifically, the information may be for identifying the Network Slice in which the MME selected by the eNB_A 45 is included. Here, the identification information may be for identifying the Network Slice through the connection established in the establishment procedure of the supplemental PDN connection. In other words, the 16th identification information may be identification information to identify the Network Slice that the connection thereto is authenticated by the network in the establishment procedure of the supplemental PDN connection. The 16th identification information may be information indicating the Network Slice that is identical to that of the 13th identification information.

Additionally, the 17th identification information may be the degree of independence of the Network slice. In other words, the 17th identification information may be the degree of independence of the NF included in the Network Slice.

For example, the 17th identification information may be information indicating the degree of independence of the MME with respect to other Network slices. In the present embodiment, since the MME may be included in one or multiple Network Slices, the number of the Network Slices in which the MME is included may be managed while being made to correspond to the degree of independence. Specifically, for example, in the case that the MME_A 104 belongs to the Network slice_A 101 and is independent of other Network slices, the isolation level may be made to be the level 2. On the other hand, in the case that the MME_A 104 belongs to the Network slice_A 101 and the Network slice_B 102 and the MME_A 104 is not independent of other Network slices (the Network slice_B in this case), the isolation level may be the level 1. In other words, the 17th identification information may be information indicating the degree of independence of the MME.

Here, the information may be for indicating the degree of independence in the connection established in the establishment procedure of the supplemental PDN connection with respect to the Network slice supporting the Network Slice type other than the Network Slice type identified by the 15th identification information and/or the Network Slice other than the Network Slice identified by the 16th identification information. The degree of independence identified by the 17th identification information may be identical to the degree of independence identified by the 14th identification information. Additionally, the degree of independence identified by the 17th identification information may be the degree of independence that is higher than the degree of independence identified by the 14th identification information.

Additionally, the MME_B 106 may further include the APN in the Activate default EPS bearer context Request message.

The APN may be the information for indicating the connection point and the function unit for the connection between the Network Slice Instance and the PDN.

The UE_A 10 receives the Activate default EPS bearer context Request message transmitted by the MME_B 106.

On the basis of the reception of the Activate default EPS bearer context Request message from the MME_B 106, the UE_A 10 reconfigures the RRC connection between the eNB_A 45 and the UE_A 10, transmits a PDN connectivity complete message to the MME_B 106, and completes a procedure to establish the supplemental PDN connection and/or a bearer establishment procedure. Specifically, the UE_A 10 transmits the RRC connection reconfiguration complete message to the eNB_A 45, and the eNB_A 45 transmits the Initial Context Response message to the MME_B 106. Here, the Initial Context Response message may include the TEID of the eNB_A 45 or the downlink address of the eNB_A 45. Furthermore, the UE transmits the PDN connectivity complete message to the MME via the eNB_A 45.

As described above, based on the indication from the network, the UE_A 10 may perform rerouting of the PDN connectivity Request message, and a procedure to establish the additional PDN connection via the new Network Slice.

1.3.4.2. Second PDN Connectivity Procedure

Next, a second PDN connectivity Request message procedure will be described.

In the first PDN connectivity Request message procedure, the procedure in which the eNB_A 45 transmits the NAS message including the PDN connectivity Request message to the MME selected in the Attach procedure as usual, and then performs rerouting to the optimum MME was described.

In the second PDN connectivity Request message procedure, at a time point of receiving the PDN connectivity Request message from the UE_A 10, the eNB_A 45 selects the optimum MME, and transmits the PDN connectivity Request message to the selected MME. In other words, the second PDN connectivity Request message procedure is the establishment procedure of the PDN connection to a supplemental Network slice that does not require rerouting.

Figure 14:
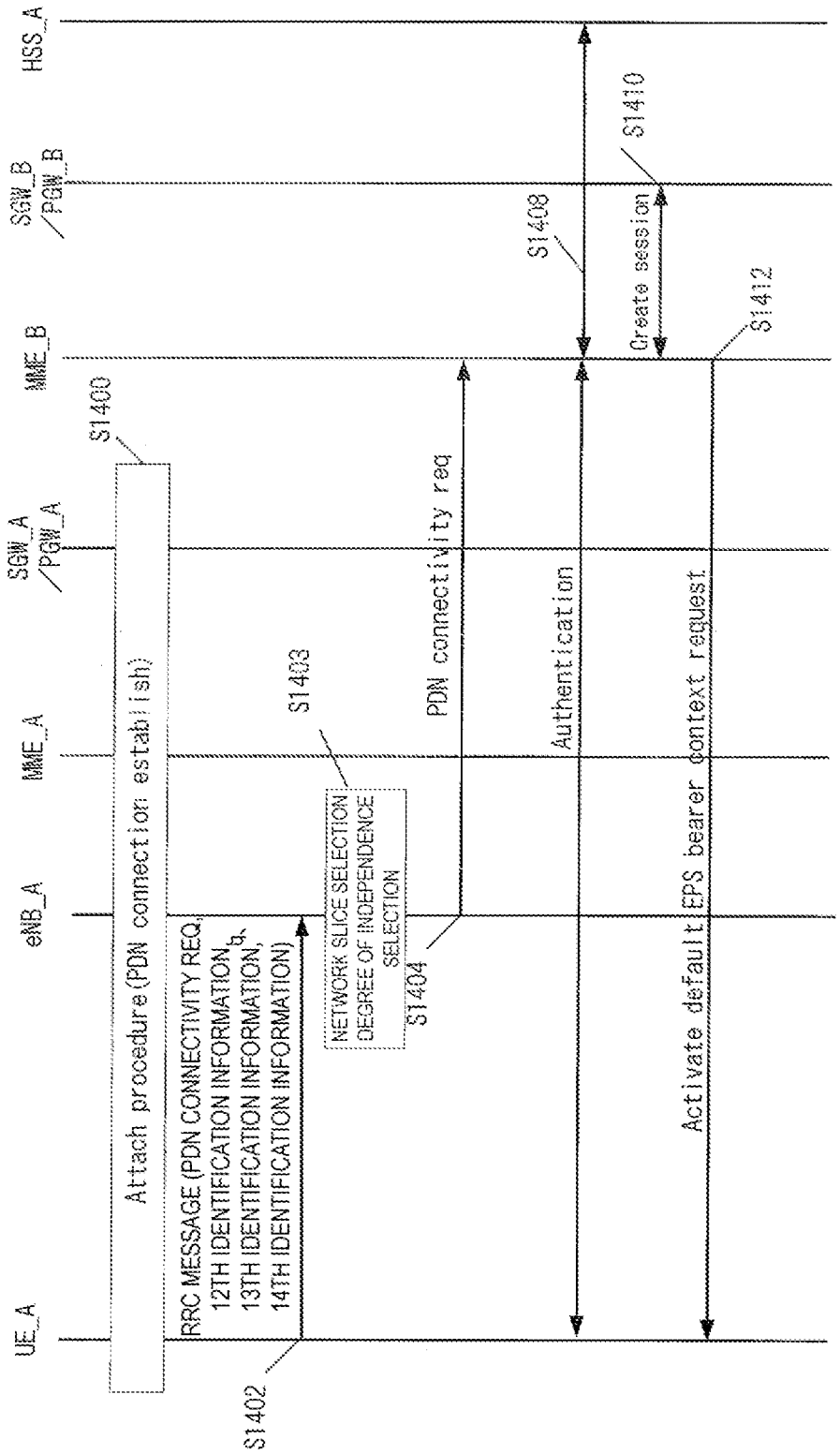
FIG. 14 is a diagram illustrating a second PDN connectivity procedure.

FIG. 14 is a diagram illustrating the second PDN Connectivity procedure.

First, the UE_A 10 has completed, as an initial state, the PDN connection via the SGW_A and the PGW_A through the Attach procedure (S1400).

This initial state may be the same as the initial state described in the chapter 1.3.4.1, and thus descriptions thereof will be omitted.

The UE_A 10 transmits the RRC message including the PDN connectivity Request message to the eNB_A 45 in order to establish the supplemental PDN connection (S1402).

The UE_A 10 may further include the 12th identification information and/or the 13th identification information and/or the 14th identification information corresponding to the requested PDN connection in the RRC message.

The 12th identification information may be information for identifying the Network Slice type requested by the UE. In a case that the UE_A 10 selects the Network Slice type, the information may be for identifying the Network Slice type selected from among the multiple pieces of first identification information included in the eighth identification information group received by the UE_A 10 from the eNB_A 45. Alternatively, in a case that the UE_A 10 does not select the Network Slice type from the eighth identification information group notified from the network, the 12th identification information may be information for identifying the Network Slice type stored in the UE.

The 13th identification information may be information for identifying the Network Slice requested by the UE. In a case that the UE_A 10 selects the Network Slice, the information may be for identifying the Network Slice selected from the multiple pieces of third identification information included in the ninth identification information group received by the UE_A 10 from the eNB_A 45. Alternatively, in a case that the UE_A 10 does not select the Network Slice from the ninth identification information group notified from the network, the 13th identification information may be information for identifying the Network Slice stored in the UE.

The 14th identification information may be the degree of independence of the Network slice requested by the UE. In other words, the 14th identification information may be the degree of independence of the NF included in the Network Slice requested by the UE.

For example, the 14th identification information may be information indicating the degree of independence of the MME with respect to other Network slices. In the present embodiment, since the MME may be included in one or multiple Network Slices, the number of the Network Slices in which the MME is included may be managed while being made to correspond to the degree of independence. Specifically, for example, in a case that the MME_A 104 belongs to the Network slice_A and is independent of other Network slices, the isolation level may be made to be the level 2. On the other hand, in a case that the MME_A 104 belongs to the Network slice_A and the Network slice_B and the MME_A 104 is not independent of other Network slices (the Network slice_B in this case), the isolation level may be the level 1. In other words, the 14th identification information may be information indicating the degree of independence of the MME.

The UE_A 10 may further include the identification information on the UE in the RRC message.

The PDN connectivity Request message may include the APN. The APN may be information indicating a connection point and a connection function unit between the PDN and the Network Slice Instance.

Additionally, the UE_A 10 may transmit the RRC message while including a Flag for requesting the MME reselection therein to the eNB_A 45.

Additionally, the PDN connectivity Request message may include the seventh identification information and/or the 21st identification information.

Here, the seventh identification information may also be identification information indicating that the UE requests connections to multiple Network Slices. The seventh identification information may also be the UE preference information.

Additionally, the 21st identification information may be the application identification information. Furthermore, the information may be for identifying a service.

Additionally, the UE_A 10 may further include the 12th identification information and/or the 13th identification information and/or the 14th identification information in the PDN connectivity Request message.

The eNB_A 45 receives the RRC message and/or the PDN connectivity request transmitted by the UE_A 10.

The eNB_A 45 selects the Network slice Type and/or the Network Slice of the new PDN connection based on the reception of the PDN connectivity Request message, and the 12th identification information and/or the 13th identification information from the UE_A 10 (S1403).

Specifically, for example, in a case that identification information for identifying the Network Slice type_A is received as the 12th identification information from the UE_A 10, the eNB_A 45 determines to select the MME from the list of the MMEs supporting the Network Slice type_A.

Additionally, in a case that the UE_A 10 does not transmit the 12th identification information and/or the 13th identification information with the PDN connectivity Request message, or in a case that the MME that supports the Network Slice type identified by the 12th identification information and/or the Network Slice identified by the 13th identification information transmitted by the UE_A 10 with the PDN connectivity Request message cannot be selected, the eNB_A 45 may select the MME of a default Network slice.

Furthermore, the eNB_A 45 selects the isolation level based on the reception of the PDN connectivity Request message and the 14th identification information from the UE_A 10 (S1403).

Specifically, for example, in a case that identification information indicating that the isolation level is the level 2 is received as the 14th identification information from the UE_A 10, the eNB_A 45 further selects the MME whose isolation level is at least the level 2 or more from the list of the MMEs selected by selection of the Network Slice type.

Note that, in the case that the MME supporting the Isolation level identified by the 14th identification information received from the UE_A 10 cannot be selected from the MME list, the eNB_A 45 may select an alternative MME such as selecting an MME supporting the highest degree of independence, or the like.

Additionally, in addition to these selections, the eNB_A 45 may select the MME in accordance with the physical location or the load state to each MME resource, as in an existing method.

Additionally, in a case that the UE_A 10 does not transmit the 14th identification information with the PDN connectivity Request message while including it in the message, the MME selection based on the Isolation level may not be performed.

By the above-described procedures, the eNB_A 45 selects the MME to be a transfer destination of the PDN connectivity Request message. In other words, the eNB_A 45 selects a Network slice to which the UE_A 10 connects. Furthermore, the eNB_A 45 may select the degree of independence of the Network slice to which the UE_A 10 connects. Hereinafter, the MME selected by the eNB_A 45 is assumed to be the MME_B 106. In other words, it is assumed that the eNB_A 45 selects the Network slice_B as the Network slice, and the level 2 as the Isolation level.

The eNB_A 45 transfers the PDN connectivity Request message to the selected MME_B 106 (S1404). The eNB_A 45 may include the identification information of the MME_A 104 and the UE ID in the transmission message with the PDN connectivity Request message. Additionally, the eNB_A 45 may further include 22nd identification information in the transmission message.

Here, the 22nd identification information may be information indicating that the transmitted NAS message is transmitted from the UE that already established the NAS connection to another MME. Additionally, the 22nd identification information may be information for requesting the MME_B 106 to acquire context information of the UE_A 10 from the MME_A 104 or the HSS_A 50.

The MME_B 106 receives the PDN connectivity request that is transferred by the eNB_A 45.

The MME_B 106 may perform, based on the reception of the PDN connectivity Request message from the eNB_A 45, an authentication procedure between the HSS_A 50 and the UE_A 10 (S1408). An authentication procedure between the MME_A 104 and the HSS_A 50 and an authentication procedure between the MME_A 104 and the UE_A 10 may be the same as the procedure that is described in the attach procedure illustrated in FIG. 8.

Additionally, before the authentication procedure, based on the reception of the 22nd identification information from the eNB_A 45, the MME_B 106 may request the UE context of the UE_A 10 to the MME_A 104 and acquire it.

The authentication procedure is completed, then the MME_B 106 selects the SGW and the PGW, and performs the Create Session procedure with the SGW and the PGW (S1410).

The selection method of the SGW and the PGW and the Create Session procedure may be the same as the procedures illustrated in FIG. 8.

The MME_B 106 transmits, based on establishment of a communication path between the SGW and the PGW, the Activate default EPS bearer context Request message to the UE_A 10 (S1412). The MME_B 106 may include the 15th identification information and/or the 16th identification information and/or the 17th identification information in the Activate default EPS bearer context Request message.

Here, the 15th identification information may be information to identify the Network Slice Type that the network allows the UE to connect to. Specifically, the information may be for identifying the Network Slice type supported by the MME selected by the eNB_A 45. Here, the identification information may be for identifying the Network Slice type through the connection established in the establishment procedure of the supplemental PDN connection. In other words, the 15th identification information may be identification information to identify the Network Slice type that the UE_A 10 is authenticated to connect to by the network by the PDN connectivity Request message from the UE_A 10. The 15th identification information may be information indicating the Network Slice type that is identical to that of the 12th identification information.

The 16th identification information may be information to identify the Network Slice that the network allows the UE to connect to. Specifically, the information may be for identifying the Network Slice in which the MME selected by the eNB_A 45 is included. Here, the identification information may be for identifying the Network Slice through the connection established in the establishment procedure of the supplemental PDN connection. In other words, the 16th identification information may be identification information to identify the Network Slice that the connection thereto is authenticated by the network in the establishment procedure of the supplemental PDN connection. The 16th identification information may be information indicating the Network Slice that is identical to that of the 13th identification information.

Additionally, the 17th identification information may be the degree of independence of the Network slice. In other words, the 17th identification information may be the degree of independence of the NF included in the Network Slice.

For example, the 17th identification information may be information indicating the degree of independence of the MME with respect to other Network slices. In the present embodiment, since the MME may be included in one or multiple Network Slices, the number of the Network Slices in which the MME is included may be managed while being made to correspond to the degree of independence. Specifically, for example, in the case that the MME_A 104 belongs to the Network slice_A 101 and is independent of other Network slices, the isolation level may be made to be the level 2. On the other hand, in the case that the MME_A 104 belongs to the Network slice_A 101 and the Network slice_B 102 and the MME_A 104 is not independent of other Network slices (the Network slice_B in this case), the isolation level may be the level 1. In other words, the 17th identification information may be information indicating the degree of independence of the MME.

Here, the information may be for indicating the degree of independence in the connection established in the establishment procedure of the supplemental PDN connection with respect to the Network slice with the Network Slice type other than the Network Slice type identified by the 15th identification information and/or the Network Slice identified by the 16th identification information. The degree of independence identified by the 17th identification information may be identical to the degree of independence identified by the 14th identification information. Additionally, the degree of independence identified by the 17th identification information may be the degree of independence that is higher than the degree of independence identified by the 14th identification information.

Additionally, the MME_B 106 may further include the APN in the Activate default EPS bearer context Request message.

The APN may be the information for indicating the connection point and the function unit for the connection between the Network Slice Instance and the PDN.

The UE_A 10 receives the Activate default EPS bearer context Request message transmitted by the MME_B 106.

On the basis of the reception of the Activate default EPS bearer context Request message from the MME_B 106, the UE_A 10 reconfigures the RRC connection between the eNB_A 45 and the UE_A 10, transmits the PDN connectivity complete message to the MME_B 106, and completes the supplemental PDN connection and/or the bearer establishment procedure. Specifically, the UE_A 10 transmits the RRC connection reconfiguration complete message to the eNB_A 45, the eNB_A 45 transmits the Initial Context Response message to the MME_B 106. Here, the Initial Context Response message may include the TEID of the eNB_A 45 or the downlink address of the eNB_A 45. Furthermore, the UE transmits the PDN connectivity complete message to the MME_B 106 via the eNB_A 45.

As described above, the UE_A 10 may perform the procedure to establish the supplemental PDN connection via the new Network Slice without rerouting.

2. Second Embodiment

In the first embodiment, the procedure in which the UE_A 10 establishes one PDN connection via the Network slice classified as a specific Network Slice type using the Attach procedure was described.

In an operation of the Network slice, the UE is requested to simultaneously connect to multiple Network slices. In the following descriptions, a case of establishing a PDN connection via multiple Network slices through the Attach procedure will be described.

Note that a system overview and a device configuration may be the same as those in the first embodiment, and thus descriptions thereof will be omitted.

2.1. Processing Example

A processing example of the present embodiment will be described below. Note that a notification procedure of the Network Slice type from the core network to the UE performed before starting the Attach procedure may be the same as the method described in the first embodiment.

2.1.1. Attach Procedure

Figure 12:
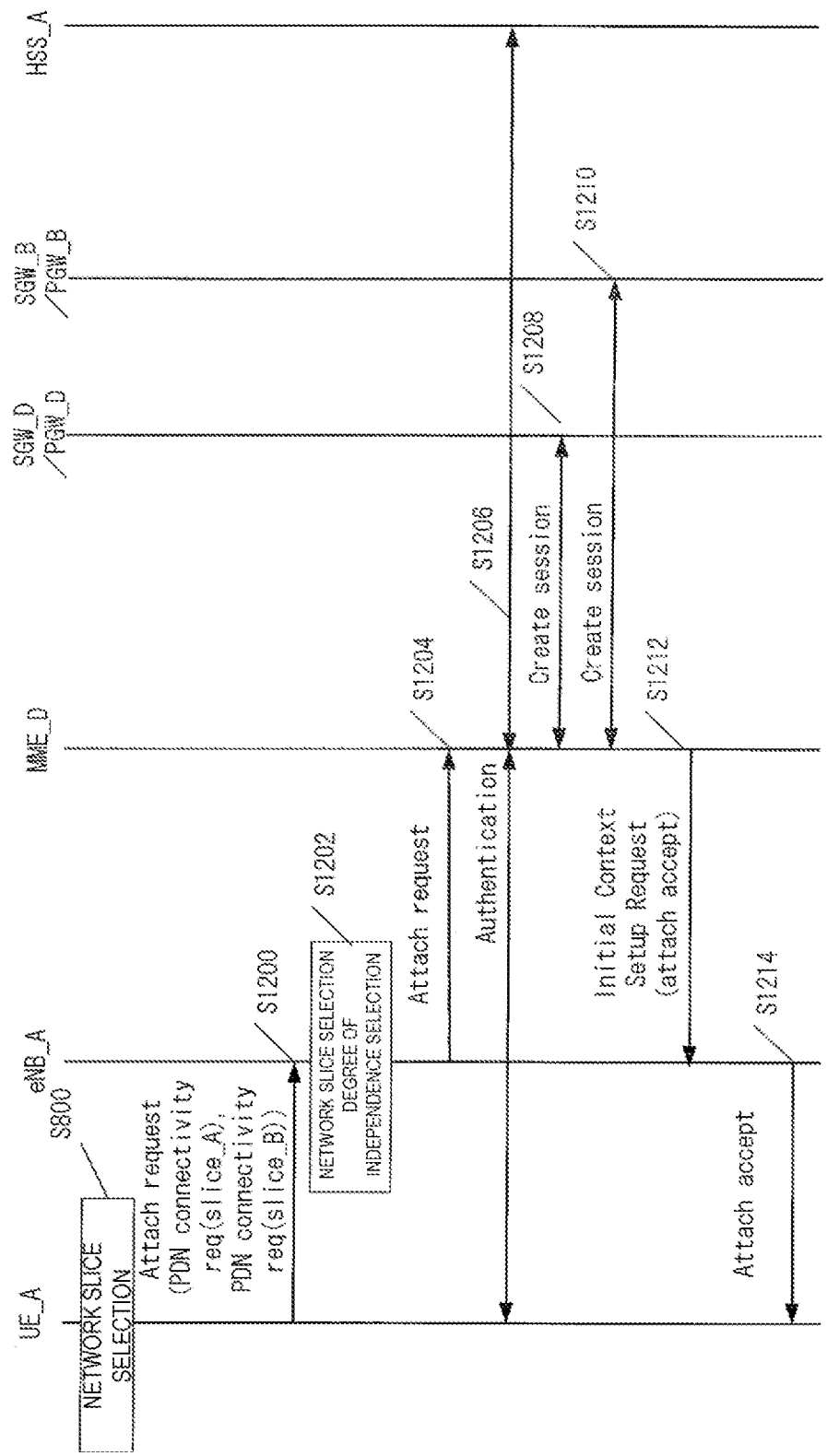
FIG. 12 is a diagram illustrating an attach procedure.

FIG. 12 is a diagram illustrating the Attach procedure according to the present embodiment.

The UE_A 10 selects the Network Slice type and/or the Network Slice based on reception of the RRC message, and/or reception of the eighth identification information group and/or the ninth identification information group from the eNB_A 45 (S800). The UE_A 10 may select the Network Slice type and/or Network Slice to be requested based on the Network Slice type or the UE usage type that the UE stores.

The UE_A 10 may select the Network Slice type and/or the Network Slice, in a case that the eNB_A 45 does not support the Network Slice type and/or the Network Slice that the UE itself stores, among the Network Slice types notified by the eNB_A 45.

At this time, the UE_A 10 may select multiple Network Slice types and/or Network Slices. For example, based on the UE_A 10 receiving the 11th identification information by the RRC response message in FIG. 7, the UE_A 10 may select the multiple Network Slice Types and/or Network Slices.

Here, it is assumed that the UE_A 10 selects the Network Slice type_A and the Network Slice type_B.

The UE_A 10 transmits the Attach Request message to the eNB_A 45 (S1200). The UE_A 10 may transmit the Attach Request message while including the 12th identification information and/or the 13th identification information and/or the 14th identification information and/or the seventh identification information therein.

The 12th identification information may be information for identifying the Network Slice type requested by the UE. In a case that the UE_A 10 selects the Network Slice type, the information may be for identifying the Network Slice type selected from among the multiple pieces of first identification information included in the eighth identification information group received by the UE_A 10 from the eNB_A 45. Alternatively, in a case that the UE_A 10 does not select the Network Slice type from the eighth identification information group notified from the network, the 12th identification information may be information for identifying the Network Slice type stored in the UE.

The 13th identification information may be information for identifying the Network Slice requested by the UE. In a case that the UE_A 10 selects the Network Slice, the information may be for identifying the Network Slice selected from the multiple pieces of third identification information included in the ninth identification information group received by the UE_A 10 from the eNB_A 45. Alternatively, in a case that the UE_A 10 does not select the Network Slice from the ninth identification information group notified from the network, the 13th identification information may be information for identifying the Network Slice stored in the UE.

The 14th identification information may be the degree of independence of the Network slice requested by the UE. In other words, the 14th identification information may be the degree of independence of the NF included in the Network Slice requested by the UE.

For example, the 14th identification information may be information indicating the degree of independence of the MME with respect to other Network slices. In the present embodiment, since the MME may be included in one or multiple Network Slices, the number of the Network Slices in which the MME is included may be managed while being made to correspond to the degree of independence. Specifically, for example, in a case that the MME_A 104 belongs to the Network slice_A and is independent of other Network slices, the isolation level may be made to be the level 2. On the other hand, in a case that the MME_A 104 belongs to the Network slice_A and the Network slice_B and the MME_A 104 is not independent of other Network slices (the Network slice_B in this case), the isolation level may be the level 1. In other words, the 14th identification information may be information indicating the degree of independence of the MME.

Additionally, the seventh identification information may also be identification information indicating that the UE requests connections to multiple Network Slices. The seventh identification information may also be the UE preference information.

In a case that the UE_A 10 selects the multiple Network Slice types and Network Slices in S800, the UE_A 10 may transmit multiple pieces of the 12th identification information and/or the 13th identification information and/or multiple pieces of the 14th identification information with the Attach Request message. Specifically, the 12th identification information for identifying the Network Slice type_A and the 12th identification information for identifying the Network Slice type_B may be transmitted with the Attach Request message. Furthermore, the 14th identification information indicating that the Isolation level being made to correspond to each piece of the 12th identification information is the level 1 may be transmitted with the Attach Request message.

Additionally, the UE_A 10 may transmit the Attach Request message, while including at least the IMSI or the Globally Unique Temporary Identity (GUTI), the UE Network capability, and an EPS Session Management (ESM) Message Container therein.

The ESM Message Container is the message container for transmitting the Session Management Message together with the Mobility Management Message such as the Attach Request message or the like. Specifically, for example, the UE_A 10 may transmit the ESM Message Container while including a PDN Connectivity Request message therein.

The UE_A 10 may transmit the Attach Request message while further including the 12th identification information and/or the 13th identification information and/or the 14th identification information therein. Specifically, the PDN connectivity Request message may include the 12th identification information and/or the 13th identification information and/or the 14th identification information.

Note that, here, the UE_A 10 selects the multiple Network Slice types, in a case that multiple PDN connections are established, the UE_A 10 may transmit the multiple ESM Message Containers or the ESM Massage Container including the multiple PDN connectivity Request messages while including them in the Attach Request message.

Note that, in this case, each of the multiple PDN connectivity Request messages may be transmitted while including the 12th identification information and/or the 13th identification information and/or the 14th identification information.

The eNB_A 45 receives the RRC message and/or the Attach Request message transmitted by the UE_A 10.

The eNB_A 45 selects the Network Slice type and/or the Network Slice based on the reception of the Attach Request message, and the 12th identification information, and/or the 13th identification information from the UE_A 10 (S1202).

Specifically, for example, in a case that identification information for identifying the Network slice Type_A and identification information for identifying the Network slice Type_B are received as the 12th identification information from the UE_A 10, the eNB_A 45 determines to select the MME from the list of the MMEs supporting the Network Slice type_A and a list of the MMEs supporting the Network Slice type_B.

Alternatively, in the same manner, in a case that identification information for identifying the Network slice_A and identification information for identifying the Network slice_B are received as the 13th identification information from the UE_A 10, the eNB_A 45 determines to select the MME from the list of the MMEs included in the Network Slice_A and a list of the MMEs included in the Network Slice_B.

Furthermore, the eNB_A 45 selects the isolation level based on the reception of the Attach Request message and the 14th identification information from the UE_A 10 (S1202).

Specifically, for example, in a case that identification information indicating that the isolation level is the level 1 is received as the 14th identification information from the UE_A 10, the eNB_A 45 further selects the MME whose isolation level is at least the level 1 or higher from the list of the MMEs selected by selection of the Network Slice type.

Note that, in the case that the MME supporting the Isolation level identified by the 14th identification information received from the UE_A 10 cannot be selected from the MME list, the eNB_A 45 may select an alternative MME such as selecting an MME supporting the highest degree of independence, or the like.

Additionally, the eNB_A 45 performs the selection of these MMEs based on the selection of the Network Slice type and the selection of the Isolation level for each PDN connectivity Request message received with the Attach Request message.

Additionally, in a case that the eNB_A 45 can select the same MME as a result of the selection of the multiple MMEs, the same MME may be selected.

Additionally, in addition to these selections, the eNB_A 45 may select the MME in accordance with the physical location or the load state to each MME resource, as in an existing method.

Additionally, in a case that the UE_A 10 transmits the Old GUTI to the eNB_A 45 with the Attach Request message, the eNB_A 45 may select the MME based on an NAS Node Selection Function (NNSF) as in an existing method. In this case, the eNB_A 45 may give priority to the selection based on the NNSF.

Through the above-described procedure, the eNB_A 45 selects the MME responsible for a mobility management function of the UE_A 10. Hereinafter, the MME selected by the eNB_A 45 is assumed to be the MME_D 105.

Next, the eNB_A 45 transmits the Attach Request message to the MME_D 105 (S1204). The eNB_A 45 may transfer the received Attach Request message to the MME_D 105.

The eNB_A 45 may transmit the 12th identification information and/or the 13th identification information and/or the 14th identification information with the Attach Request message.

In a case that the eNB_A 45 selects multiple MMEs for each Network Slice type, the eNB_A 45 may transfer the Attach Request message to each MME. In this case, the eNB_A 45 may transmit the 12th identification information and/or the 13th identification information identifying the corresponding Network Slice type with the Attach Request message. Furthermore, the 14th identification information may also be transmitted together.

In a case that there is no UE context of the UE_A 10, the MME_D 105 performs an authentication procedure between the HSS_A 50 and the UE_A 10 (S1206). The MME_D 105 generates the UE context of the UE_A 10 by the authentication procedure and stores it.

At this time, the MME_D 105 may acquire, from the HSS_A 50, the UE usage type and/or the Network Slice type of the UE_A 10.

Alternatively, the MME_D 105 may acquire, using a procedure that is different from the authentication procedure, from the HSS, the UE usage type and/or the Network Slice type.

The authentication procedure is completed, then the MME_D 105 selects the SGW and the PGW for each PDN connectivity Request message, and performs the Create Session procedures with the SGW and the PGW, respectively (S1208, S1210).

Specifically, for example, the MME_D 105 transmits the first Create Session Request message to the SGW_A 35, and the SGW_A 35 transmits, based on the received first Create Session Request message, the second Create Session Request message to the PGW_A 30. Furthermore, the PGW_A 30 transmits the first Create Session Response message to the SGW_A 35, and the SGW_A 35 transmits the second Create Session Response message to the MME. Through the above-described procedures, a bearer is established between the MME_D 105 and the SGW_A 35 and between the SGW A35 and the PGW_A 30.

In the same manner, the MME_D 105 may establish a bearer between the MME_D 105 and the SGW_B and between the SGW_B and the PGW_B by performing the Create Session procedure for the SGW_B and the PGW_B (S1210).

The MME_D 105 transmits the Attach Accept message to the eNB_A 45 in order to transmit it to the UE_A 10 based on completion of the Create Session establishment procedure (S1212).

The MME_D 105 may include the 15th identification information and/or the 16th identification information and/or the 17th identification information in the Attach Accept message.

Here, the 15th identification information may be information to identify the Network Slice Type that the network allows the UE to connect to. Specifically, the information may be for identifying the Network Slice type supported by the MME selected by the eNB_A 45. Here, the identification information may be for identifying the Network Slice type through the connection established in this Attach procedure. In other words, the 15th identification information may be identification information to identify the Network Slice type that the connection thereto is authenticated by the network in the Attach procedure. The 15th identification information may be information indicating the Network Slice type that is identical to that of the 12th identification information.

The 16th identification information may be information to identify the Network Slice that the network allows the UE to connect to. Specifically, the information may be for identifying the Network Slice in which the MME selected by the eNB_A 45 is included. Here, the identification information may be for identifying the Network Slice through the connection established in this Attach procedure. In other words, the 16th identification information may be identification information to identify the Network Slice that the connection thereto is authenticated by the network in the Attach procedure. The 16th identification information may be information indicating the Network Slice that is identical to that of the 13th identification information.

Additionally, the 17th identification information may be the degree of independence of the Network slice. In other words, the 17th identification information may be the degree of independence of the NF included in the Network Slice.

For example, the 17th identification information may be information indicating the degree of independence of the MME with respect to other Network slices. In the present embodiment, since the MME may be included in one or multiple Network Slices, the number of the Network Slices in which the MME is included may be managed while being made to correspond to the degree of independence. Specifically, for example, in the case that the MME_A 104 belongs to the Network slice_A 101 and is independent of other Network slices, the isolation level may be made to be the level 2. On the other hand, in the case that the MME_A 104 belongs to the Network slice_A 101 and the Network slice_B 102 and the MME_A 104 is not independent of other Network slices (the Network slice_B in this case), the isolation level may be the level 1. In other words, the 17th identification information may be information indicating the degree of independence of the MME.

Here, the information may be for indicating the degree of independence in the connection established in the Attach procedure with respect to the Network slice with the Network Slice type other than the Network Slice type identified by the 15th identification information and/or the Network Slice identified by the 16th identification information. The degree of independence identified by the 17th identification information may be identical to the degree of independence identified by the 14th identification information. Additionally, the degree of independence identified by the 17th identification information may be the degree of independence that is higher than the degree of independence identified by the 14th identification information.

The MME_D 105 may transmit the 15th identification information and/or the 16th identification information and/or the 17th identification information by a message independent of the Attach Accept message. Specifically, for example, the MME_A 104 may transmit the initial context Setup Request message in which the Attach Accept message is included, while including the 15th identification information and/or the 16th identification information and/or the 17th identification information therein, to the eNB_A 45.

Alternatively, the MME_D 105 may transmit the 15th identification information and/or the 16th identification information and/or the 17th identification information while including these pieces of information in the Activate Default EPS bearer context Request message in the ESM message Container included in the Attach Accept message.

In other words, the MME_D 105 may transmit the Activate Default EPS bearer context Request message in the ESM message Container to the UE_A 10.

Note that the Attach Accept message may include the APN, the GUTI, the PDN address (the IP address of the UE), the EPS bearer ID, and the ESM message Container.

Note that the MME_D 105 may transmit one or multiple pieces of the 15th identification information and/or one or multiple pieces of the 16th identification information and/or one or multiple pieces of the 17th identification information to the eNB_A 45. Specifically, in a case that the MME_D 105 establishes multiple connections of a connection via the SGW_A 35/the PGW_A 30 and a connection via the SGW_B/the PGW_B, the MME_D 105 may notify the eNB_A 45 of the 15th identification information for identifying the Network Slice type connected in each connection and/or the 16th identification information for identifying the Network Slice and/or the 17th identification information corresponding to each of the 15th identification information and/or the 16th identification information.

In this case, the MME_D 105 may include the one or multiple ESM message Containers in the Attach Accept message. Furthermore, the one or each of the multiple ESM message Containers may be transmitted while including the 15th identification information and/or the 16th identification information and/or the 17th identification information, to the eNB_A 45.

Additionally, the MME_D 105 may include the one or multiple Activate Default EPS bearer context Request messages in the ESM message Container in the Attach Accept message. Furthermore, the one or each of the multiple Activate Default EPS bearer context Request messages may be transmitted while including the 15th identification information and/or the 16th identification information and/or the 17th identification information, to the eNB_A 45.

Specifically, in the case that the eNB_A 45 receives, from the UE_A 10, the PDN connectivity Request message for requesting the PDN connection to the Network slice_A 101 and the PDN connectivity Request message for requesting the connection to the Network slice_B 102 that are included in the Attach Request message, the MME_A 104 may transmit the Activate Default EPS bearer context Request message with respect to the PDN connection to the Network slice_A 101 and the Activate Default EPS bearer context Request message with respect to the PDN connection to the Network slice_B 102 to the UE_A 10 via the eNB_A 45.

Additionally, in a case that the 17th identification information is the Isolation level of the MME, the 17th identification information included in the Activate Default EPS bearer context Request message and the 17th identification information included in the Activate Default EPS bearer context Request message with respect to the PDN connection to the Network slice_B 102 may be information indicating the same Isolation level.

Additionally, in a case that, in the procedure of S1208 or S1210, the bearer can be established in one Create Session procedure, and the bearer cannot be established in the other Create Session procedure, the MME_D 105 may transmit the Attach Accept message with respect to the procedure in which the bearer is successfully established.

In this case, the MME_D 105 may further transmit, based on the failure of the bearer, a PDN connectivity reject message with respect to the procedure of the failure to the eNB_A 45. Note that the MME_D 105 may transmit the PDN connectivity reject message while including it in the ESM message Container.

The MME_D 105 may transmit the initial context Setup Request message while including the Activate Default EPS bearer context Request messages or PDN connectivity Accept messages whose number is different from the number of the PDN connectivity Request messages included in the PDN connectivity Request message received from the eNB_A 45 therein.

Specifically, in a case that the UE_A 10 transmits, to the eNB_A 45, the PDN connectivity Request message for requesting the PDN connection to the Network slice_A 101 and the PDN connectivity Request message for requesting the connection to the Network slice_B 102 while including the messages in the Attach Request message, in a case that the MME_D 105 successfully establishes the bearer for establishing the PDN connection via the Network slice_A 101 and refuses the establishment of the PDN connection via the Network slice_B 102, the MME_D 105 may transmit the initial context Setup Request message while including the Attach Accept message therein. The Attach Accept message may be transmitted while including one Activate Default EPS bearer context Request message. Furthermore, the MME_D 105 may independently transmit the PDN connectivity reject message to the eNB_A 45 as a response to the PDN connectivity Request message that fails the bearer establishment. Alternatively, the MME_D 105 may include the response message to the Attach Request message in the initial context Setup Request message and include one Activate Default EPS bearer context Request message and the PDN connectivity reject message in the response message, and transmit the messages.

The eNB_A 45 receives the Attach Accept message transmitted by the MME_D 105.

Subsequently, the eNB_A 45 transmits, based on the Attach Accept message from the MME_D 105, the Attach Accept message to the UE_10 (S1214).

The Attach Accept message may include one or multiple pieces of the 15th identification information and/or one or multiple pieces of the 16th identification information and/or one or multiple pieces of the 17th identification information.

Alternatively, the eNB_A 45 may transmit the 15th identification information and/or the 16th identification information and/or the 17th identification information by a message independent of the Attach Accept message. Specifically, for example, the RRC message transmitted with the Attach Accept message may be transmitted while including the 15th identification information and/or the 16th identification information and/or the 17th identification information.

Alternatively, the eNB_A 45 may transmit the 15th identification information and/or the 16th identification information and/or the 17th identification information while including these pieces of information in the Activate Default EPS bearer context Request message in the ESM message Container included in the Attach Accept message.

In other words, the eNB_A 45 may transmit one or multiple Activate Default EPS bearer context Request messages to the UE_A 10.

The UE_A 10 receives the Attach Accept message transmitted by the MME_D 105 via the eNB_A 45.

For example, in a case that the UE_A 10 transmits, to the MME_A 104, the PDN connectivity Request message for requesting the PDN connection to the Network slice_A 101 and the PDN connectivity Request message for requesting the connection to the Network slice_B 102 while including the messages in the Attach Request message, the UE_A 10 may acquire each identification information with respect to the PDN connection to the Network slice_A 101 and each identification information with respect to the PDN connection to the Network slice_A 101 from the MME_A 104. Here, each identification information may include the 15th identification information and/or the 16th identification information and/or the 17th identification information.

On the basis of the reception of the Attach Accept message, the UE_A 10 reconfigures the RRC connection between the eNB_A 45 and the UE_A 10, transmits the Attach complete message to the MME_A 104, and completes the PDN connection. Specifically, the UE_A 10 transmits the RRC connection reconfiguration complete message to the eNB_A 45, and the eNB_A 45 transmits the Initial Context Response message to the MME_A 104. Here, the Initial Context Response message may include the TEID of the eNB_A 45 or the downlink address of the eNB_A 45. Furthermore, the UE transmits the Attach complete to the MME via the eNB_A 45.

As described above, the UE_A 10 can establish the PDN connection via the Network slice_A and Network slice_B through the attach procedure.

3. Modification

A program running on a device according to the present invention may serve as a program that controls a Central Processing Unit (CPU) and the like, and causes a computer to operate in such a manner as to realize the functions of the embodiment according to the present invention. Programs or the information handled by the programs are temporarily stored into a volatile memory such as a Random Access Memory (RAM), a non-volatile memory such as a flash memory, a Hard Disk Drive (HDD), or other storage device systems.

Note that a program for realizing functions of the embodiments according to the present invention may be recorded on a computer-readable recording medium. A computer system may be caused to read the program recorded on the recording medium for execution. It is assumed that the "computer system" refers to a computer system built into the devices, and the computer system includes an operating system and hardware components such as a peripheral device. Furthermore, the "computer-readable recording medium" may be a semiconductor recording medium, an optical recording medium, a magnetic recording medium, a medium that dynamically retains the program for a short period of time, or other computer-readable recording media.

Furthermore, each functional block or various characteristics of the devices used in the above-described embodiment may be mounted or performed on an electric circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or may be a processor of known type, a controller, a micro-controller, or a state machine. The above-mentioned electric circuits may be constituted of a digital circuit, or may be constituted of an analog circuit. Furthermore, in a case that, with advances in semiconductor technology, a circuit integration technology appears that replaces the present integrated circuits, it is also possible that the present invention uses a new integrated circuit based on the technology.

Note that the invention of the present patent application is not limited to the above-described embodiments. In the embodiment, devices have been described as an example, but the invention of the present application is not limited to these devices, and is applicable to a terminal apparatus or a communication device of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatus.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the one that is described in the embodiments is also included in the technical scope of the present invention.

REFERENCE SIGNS LIST

1 Communication system
5 PDN_A
10 UE_A
20 UTRAN_A
22 eNB (UTRAN)_A
24 RNC_A
25 GERAN_A
26 BSS_A
30 PGW_A
35 SGW_A
45 eNB_A
50 HSS_A
55 AAA_A
60 PCRF_A
65 ePDG_A
70 WLAN ANa
72 WLAN APa
74 TWAG_A
75 WLAN ANb
76 WLAN APb
80 LTE AN_A
90 Core network_A
101 Network slice_A
102 Network slice_B
103 Network slice_C

104 MME_A
105 MME_D
106 MME_B
107 MME_C

The invention claimed is:

1. A User Equipment (UE), comprising:
a transmitter configured to transmit a first request message to a core network via a base station in an initial procedure, the first request message including a plurality of first information identifying a first network slice; and
a receiver configured to receive a first accept message from the core network via the base station in the initial procedure, the first accept message including a plurality of second information identifying a second network slice selected by the core network;
wherein:
the transmitter is further configured to transmit a second request message to the base station in a procedure for network slice reselection, the second request message including information about a request to change at least one of a network slice type or an isolation level;
the receiver is further configured to receive a second accept message from the core network via the base station; and
the transmitter is further configured to transmit a third request message to a first mobility management apparatus in the core network via the base station in a procedure for updating a tracking area after the initial procedure,
wherein:
the third request message includes a global unique temporary identifier (GUTI),
the GUTI is used for the first mobility management apparatus to obtain UE context of the UE from a second mobility management apparatus managing the selected second network slice, and
the first mobility management apparatus obtains the UE context of the UE in a case that the third request message is not periodically transmitted,
wherein the UE context includes the isolation level.

2. The UE according to claim 1, further comprising:
a controller configured to determine the UE is under a condition, the condition including at least one of:
a first connection cannot be established via the second network slice,
a second connection does not have the isolation level requested by the UE,
a different network slice type is needed, or
a different isolation level is needed.

3. The UE according to claim 1, wherein the second accept message includes information about a network slice type allowed by the core network.

4. The UE according to claim 1, wherein the second accept message includes information about a third network slice allowed by the core network.

5. The UE according to claim 4, wherein the second accept message further includes information about a degree of independence of the third network slice.

6. The UE according to claim 4, wherein the second accept message further includes information for identifying a connection mode in the third network slice.

7. The UE according to claim 1, wherein the second accept message includes information about a degree of independence of a mobility management entity in the core network.

8. The UE according to claim 1, the UE further comprising:
a memory configured to store one or more Application identifiers corresponding to at least one of the first information or the second information.

9. The UE according to claim 1, wherein the second information is associated with the first information.

10. A communication method performed by a User Equipment (UE), the communication method comprising:
transmitting a first request message to a core network via a base station in an initial procedure, the first request message including a plurality of first information identifying a first network slice;
receiving a first accept message from the core network via the base station in the initial procedure, the first accept message including a plurality of second information identifying a second network slice selected by the core network;
transmitting a second request message to the base station in a procedure for network slice reselection, the second request message including information about a request to change at least one of a network slice type or an isolation level;
receiving a second accept message from the core network via the base station; and
transmitting a third request message to a first mobility management apparatus in the core network via the base station in a procedure for updating a tracking area after the initial procedure,
wherein:
the third request message includes a global unique temporary identifier (GUTI),
the GUTI is used for the first mobility management apparatus to obtain UE context of the UE from a second mobility management apparatus managing the selected second network slice, and
the first mobility management apparatus obtains the UE context of the UE in a case that the third request message is not periodically transmitted,
wherein the UE context includes the isolation level.

11. The communication method according to claim 10, further comprising:
determining the UE is under a condition, the condition including at least one of:
a first connection cannot be established via the second network slice,
a second connection does not have the isolation level requested by the UE,
a different network slice type is needed, or
a different isolation level is needed.

12. The communication method according to claim 10, wherein the second accept message includes information about a network slice type allowed by the core network.

13. The communication method according to claim 10, wherein the second accept message includes information about a third network slice allowed by the core network.

14. The communication method according to claim 13, wherein the second accept message further includes information about a degree of independence of the third network slice.

15. The communication method according to claim 13, wherein the second accept message further includes information for identifying a connection mode in the third network slice.

16. The communication method according to claim 10, wherein the second accept message includes information about a degree of independence of a mobility management entity in the core network.

17. The communication method according to claim 10, further comprising:
  storing one or more Application identifiers corresponding to at least one of the first information or the second information.

18. The communication method according to claim 10, wherein the second information is associated with the first information.

\* \* \* \* \*